(12) United States Patent
Hu et al.

(10) Patent No.: US 9,960,993 B2
(45) Date of Patent: May 1, 2018

(54) PACKET NETWORK LINEAR PROTECTION SYSTEMS AND METHODS IN A DUAL HOME OR MULTI-HOME CONFIGURATION

(71) Applicant: Ciena Corporation, Hanover, MD (US)

(72) Inventors: Jie Hu, Santa Rosa, CA (US); Marc Holness, Ottawa (CA); Asheesh Jadav, Santa Clara, CA (US); Somen Bhattacharya, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 58 days.

(21) Appl. No.: 15/193,235

(22) Filed: Jun. 27, 2016

(65) Prior Publication Data

US 2016/0308753 A1    Oct. 20, 2016

Related U.S. Application Data

(63) Continuation of application No. 14/244,341, filed on Apr. 3, 2014, now Pat. No. 9,407,535.

(51) Int. Cl.
*H04L 1/00* (2006.01)
*H04L 12/707* (2013.01)
(Continued)

(52) U.S. Cl.
CPC ............ *H04L 45/22* (2013.01); *H04L 7/0004* (2013.01); *H04L 12/462* (2013.01);
(Continued)

(58) Field of Classification Search
CPC ... H04L 45/22; H04L 12/462; H04L 12/4633; H04L 12/6418; H04L 41/0816
(Continued)

(56) References Cited

U.S. PATENT DOCUMENTS 4,477,895 A * 10/1984 Casper ...................... H04L 1/22
370/228
7,499,407 B2   3/2009 Holness et al.
(Continued)

OTHER PUBLICATIONS

ITU Recommendation G.8031/Y.1342 (Jun. 2011): Ethernet linear protection switching.
(Continued)

*Primary Examiner* — Chi H Pham
*Assistant Examiner* — Alexander O Boakye
(74) *Attorney, Agent, or Firm* — Clements Bernard Walker PLLC; Christopher L. Bernard; Lawrence A. Baratta, Jr.

(57) ABSTRACT

A packet network linear protection method, a network, and a node in a dual or multi-home configuration include designating each of a plurality of home nodes in the dual or multi-home configuration as a working home or a protect home; designating each link between each of the plurality of home nodes and an end node in the dual or multi-home configuration as active or standby; operating a protection switch state machine based on an associated linear protection protocol at each of the plurality of home nodes and the end node; communicating protection messages to each of the plurality of home nodes from the end node; and communicating protection states in an associated protection switch state machine by each of the plurality of home nodes to other home nodes and to the end node.

21 Claims, 25 Drawing Sheets

(51) Int. Cl.
  *H04L 12/46* (2006.01)
  *H04L 12/24* (2006.01)
  *H04L 12/64* (2006.01)
  *H04L 7/00* (2006.01)
  *H04L 12/703* (2013.01)
  *H04L 12/723* (2013.01)

(52) U.S. Cl.
  CPC ...... *H04L 12/4633* (2013.01); *H04L 12/6418* (2013.01); *H04L 41/0663* (2013.01); *H04L 41/0816* (2013.01); *H04L 45/28* (2013.01); *H04L 45/50* (2013.01)

(58) Field of Classification Search
  USPC .......................................................... 370/219
  See application file for complete search history.

(56) References Cited

U.S. PATENT DOCUMENTS

| | | | |
|---|---|---|---|
| 7,505,466 | B2 | 3/2009 | Rabie et al. |
| 7,633,968 | B2 | 12/2009 | Haran et al. |
| 8,018,841 | B2 | 9/2011 | Holness et al. |
| 8,144,586 | B2 | 3/2012 | McNaughton et al. |
| 8,149,692 | B2 | 4/2012 | Holness et al. |
| 8,305,938 | B2 | 11/2012 | Holness et al. |
| 8,509,061 | B2 | 8/2013 | Holness et al. |
| 8,588,060 | B2 | 11/2013 | Holness |
| 8,625,410 | B2 | 1/2014 | Abdullah et al. |
| 2007/0268817 | A1 | 11/2007 | Smallegange et al. |
| 2009/0175176 | A1 | 7/2009 | Mohan |
| 2010/0135291 | A1 | 6/2010 | Martin et al. |
| 2010/0177635 | A1 | 7/2010 | Figueira |
| 2010/0250733 | A1 | 9/2010 | Turanyi et al. |
| 2010/0260196 | A1 | 10/2010 | Holness et al. |
| 2010/0260197 | A1 | 10/2010 | Martin et al. |
| 2010/0284413 | A1 | 11/2010 | Abdullah et al. |
| 2012/0033666 | A1 | 2/2012 | Holness et al. |
| 2012/0082026 | A1* | 4/2012 | Ryoo ...................... H04L 45/22 370/220 |
| 2012/0106360 | A1 | 5/2012 | Sajassi et al. |
| 2012/0147735 | A1 | 6/2012 | Wang et al. |
| 2012/0155246 | A1 | 6/2012 | Wang et al. |
| 2012/0224471 | A1 | 9/2012 | Vinod et al. |
| 2012/0230214 | A1 | 9/2012 | Kozisek et al. |
| 2012/0243405 | A1 | 9/2012 | Holness et al. |
| 2012/0250695 | A1 | 10/2012 | Jia et al. |
| 2012/0281710 | A1 | 11/2012 | Holness et al. |
| 2013/0258840 | A1 | 10/2013 | Holness et al. |

OTHER PUBLICATIONS

Request for Comments: 6378, MPLS Transport Profile (MPLS-TP) Linear Protection, Oct. 2011.
Saltsidis, 802.1Qay PBB-TE Protection Switching Overview, Joint ITU-T/IEEE Workshop on The Future of Ethernet Transport, May 28, 2010.
Request for Comments: 6718, Pseudowire Redundancy, Aug. 2012.
Marc Holness, Metro Ethernet—History and Overview, The Greater Chicago Chapter SCTE, May 22, 2013.

\* cited by examiner

FIG. 1
Prior Art
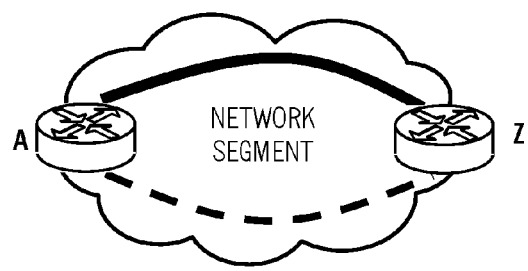
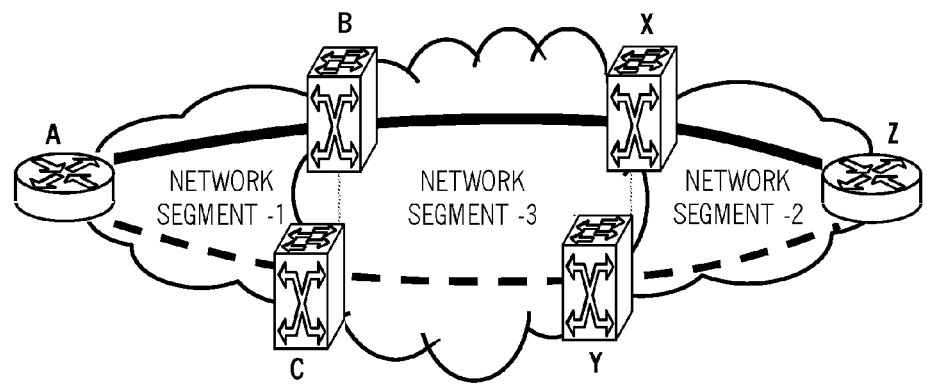
FIG. 2
Prior Art

PACKET NETWORK LINEAR PROTECTION SYSTEMS AND METHODS IN A DUAL HOME OR MULTI-HOME CONFIGURATION

CROSS-REFERENCE TO RELATED APPLICATION(S)

The present patent/application is a continuation of U.S. patent application Ser. No. 14/244,341 filed on Apr. 3, 2014, and entitled "PACKET NETWORK LINEAR PROTECTION SYSTEMS AND METHODS IN A DUAL HOME OR MULTI-HOME CONFIGURATION, the contents of which are incorporated by reference herein.

FIELD OF THE DISCLOSURE

The present disclosure relates generally to networking systems and methods. More particularly, the present disclosure relates to packet network dual-home linear protection systems and methods that use existing linear protection coordination protocols for a dual home or multi-home network topology.

BACKGROUND OF THE DISCLOSURE

Conventional Layer 2 (L2) linear protection schemes include, for example, IEEE 802.1Qay, "Provider Backbone Bridge Traffic Engineering," ITU-T Y.1731/G.8031, "Ethernet linear protection switching," RFC 6378, "Multiprotocol Label Switching (MPLS) Transport Profile (MPLS-TP) Linear Protection", and the like. These L2 linear protection schemes provide protection switching support when source and destination device are common to both working and protected paths. FIG. 1, for example, illustrates a conventional L2 network with L2 linear protection schemes implemented therein. However, when linear services span multiple network segments (owned by different network operators, for example) a [L2] linear protection scheme may be needed that provides resilient dual-homed or even multi-home access between network [segment] domains. FIG. 2, for example, illustrates a network with linear services that span multiple network segments. Between network domains, for providing better network resiliency, dual home or multi-home linear protection can be used. With a dual home topology, there is lack of a robust and interoperable way to coordinate the protection. Often, each of the dual home is not aware of the protection role and only sees the unprotected path. A solution can include proprietary approaches just for specific packet technologies, such as L2, L3 or MPLS. However, there is a need for dual home (and extendable to multi-home) linear protection in a consistent and robust way for general packet networking dual (and multi-) home linear protection coordination, with or without communication links between two homes, such that the different network domain and network technologies can be highly interoperable.

BRIEF SUMMARY OF THE DISCLOSURE

In an exemplary embodiment, a packet network linear protection method in a dual or multi-home configuration includes designating each of a plurality of home nodes in the dual or multi-home configuration as a working home or a protect home; designating each link between each of the plurality of home nodes and an end node in the dual or multi-home configuration as active or standby; operating a protection switch state machine based on an associated linear protection protocol at each of the plurality of home nodes and the end node; communicating protection messages to each of the plurality of home nodes from the end node; and communicating protection states in an associated protection switch state machine by each of the plurality of home nodes to other home nodes and to the end node. The packet network linear protection method can further include communicating the protection states by each of the plurality of home nodes to other home nodes via a designated link between home nodes or via the end node. The packet network linear protection method can further include communicating the protection states by each of the plurality of home nodes to other home nodes via the end node; and implementing protection switching responsive to a fault on any link between each of the plurality of home nodes and the end node, wherein the associated protection switch state machine at a home node of the plurality of home nodes isolated by the fault is out of synchronization until recovery of the fault.

The packet network linear protection method can further include designating each of the plurality of home nodes by configuration or signaling. The packet network linear protection method can further include designating each link between each of the plurality of home nodes and the end node, independent of working or protect designations, based on a signal carried by the end node to each of the plurality of home nodes. The associated linear protection protocol can include one of Automatic Protection Switching (APS) in G.8031, Protection State Coordination (PSC) in Multiprotocol Label Switching (MPLS) Transport Profile (MPLS-TP) (RFC 6378), Provider Backbone Bridge Traffic Engineering (PBB-TE) Tunnel Protection (IEEE 802.1ay), and 1:1 pseudowire (PW). The associated linear protection protocol can be configured to switch in a single home configuration between the end node and another end node, and wherein the packet network linear protection method adapts the associated linear protection protocol to switch between the end node and the plurality of home nodes while preserving the protection messages and the associated protection switch state machine of the associated linear protection protocol.

In another exemplary embodiment, a network providing packet network linear protection in a dual or multi-home configuration includes an end node; a plurality of home nodes each communicatively coupled to the end node by an associated link in the dual or multi-home configuration; and an associated linear protection protocol operating between the end node and the plurality of home nodes; wherein the end node and the plurality of home nodes are configured to: receive a designation as a working home or a protect home; designate each associated link between each of the plurality of home nodes and the end node as active or standby; operate a protection switch state machine based on the associated linear protection protocol; communicate protection messages therebetween; and communicate protection states in an associated protection switch state machine therebetween. The end node and the plurality of home nodes can be further configured to communicate the protection states by each of the plurality of home nodes to other home nodes via a designated link between home nodes or via the end node. The end node and the plurality of home nodes can be further configured to communicate the protection states by each of the plurality of home nodes to other home nodes via the end node; and implement protection switching responsive to a fault on any link between each of the plurality of home nodes and the end node, wherein the associated protection switch state machine at a home node of the plurality of home nodes isolated by the fault is out of synchronization until recovery of the fault.

The end node and the plurality of home nodes can be further configured to receive the designation by configuration or signaling. The end node and the plurality of home nodes can be further configured to designate each associated link between each of the plurality of home nodes and the end node, independent of working or protect designations, based on a signal carried by the end node to each of the plurality of home nodes. The associated linear protection protocol can include one of Automatic Protection Switching (APS) in G.8031, Protection State Coordination (PSC) in Multiprotocol Label Switching (MPLS) Transport Profile (MPLS-TP) (RFC 6378), Provider Backbone Bridge Traffic Engineering (PBB-TE) Tunnel Protection (IEEE 802.1ay), and 1:1 pseudowire (PW). The associated linear protection protocol can be configured to switch in a single home configuration between the end node and another end node, and wherein the associated linear protection protocol is adapted to switch between the end node and the plurality of home nodes while preserving the protection messages and the associated protection switch state machine of the associated linear protection protocol.

In yet another exemplary embodiment, a node providing packet network linear protection in a dual or multi-home configuration includes a plurality of ports communicatively coupled to a plurality of nodes over associated links in the dual or multi-home configuration; a controller communicatively coupled to the plurality of ports and operating a protection switch state machine associated with a linear protection protocol; wherein, if the node is a home node in the dual or multi-home configuration, the controller is configured to: receive a designation as a working home or a protect home; designate a link with the end node as active or standby; operate the protection switch state machine; and communicate protection messages and protection state changes to the end node and other home nodes; and wherein, if the node is the end node in the dual or multi-home configuration, the controller is configured to: designate each link with home nodes in the dual or multi-home configuration as active or standby; operate the protection switch state machine; and communicate protection messages and protection state changes to each of the home nodes. The controller can be further configured to: when the node is the home node, communicate the protection messages and the protection state changes to the end node and to other home nodes via one of a designated link or the end node. The linear protection protocol can include one of Automatic Protection Switching (APS) in G.8031, Protection State Coordination (PSC) in Multiprotocol Label Switching (MPLS) Transport Profile (MPLS-TP) (RFC 6378), Provider Backbone Bridge Traffic Engineering (PBB-TE) Tunnel Protection (IEEE 802.1ay), and 1:1 pseudowire (PW). The linear protection protocol can be configured to switch in a single home configuration between the end node and another end node, and wherein the linear protection protocol is adapted to switch between the end node and the plurality of home nodes while preserving the protection messages and the protection switch state machine of the linear protection protocol.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a conventional L2 network with L2 linear protection schemes implemented therein;

FIG. 2 is a network diagram of a network with linear services that span multiple network segments;

DETAILED DESCRIPTION OF THE DISCLOSURE

In various exemplary embodiments, the present disclosure relates to packet network linear protection systems and methods that use existing linear protection coordination protocols for a dual home or multi-home network topology. The packet network linear protection systems and methods provide a generic scheme for dual home or multi-home linear protection incorporating fault, administrative operation, and network element internal event. This includes 1+1 and 1:1 packet network linear protection coordination for IEEE 802.1Qay, "Provider Backbone Bridge Traffic Engineering (PBB-TE)" (August 2009), RFC 6378 Multiprotocol Label Switching-Transport Profile (MPLS-TP) (October 2011), ITU Recommendation G.8031 "Ethernet linear protection switching" (June 2011), RFC 6718 "Pseudowire (PW) redundancy" (August 2012), etc. The contents of IEEE 802.1Qay, RFC 6378, G.8031, and RFC 6718 are incorporated by reference herein. The packet network linear protection systems and methods use these existing linear protection coordination protocols (e.g., Automatic Protection Switching (APS), Protection State Coordination (PSC), etc.) for dual home or multi-home network topologies.

In operation, the packet network linear protection systems and methods coordinate the dual or multi-homes such that each is aware of its working/protection roles. With a dedicated communication channel between the dual or multi-homes, the packet network linear protection systems and methods use the dedicated communication channel to exchange protection protocol data units (PDUs) to synchronize the protection state machine states. Without a dedicated communication channel between the dual or multi-homes, the packet network linear protection systems and methods use the single far end to exchange protection protocol PDUs to synchronize the protection state machine states. Advantageously, the packet network linear protection systems and methods provide a generic approach for packet network dual or multi-home linear protection coordination and is flexible with a communication channel between dual home or without the communication channel. This allows full use of available single home linear protection protocols for dual or multi-home topologies. Further, the packet network linear protection systems and methods are highly interoperable for different network domains and different network technologies, such as between access and core, between Ethernet and MPLS, etc.

Figure 3:
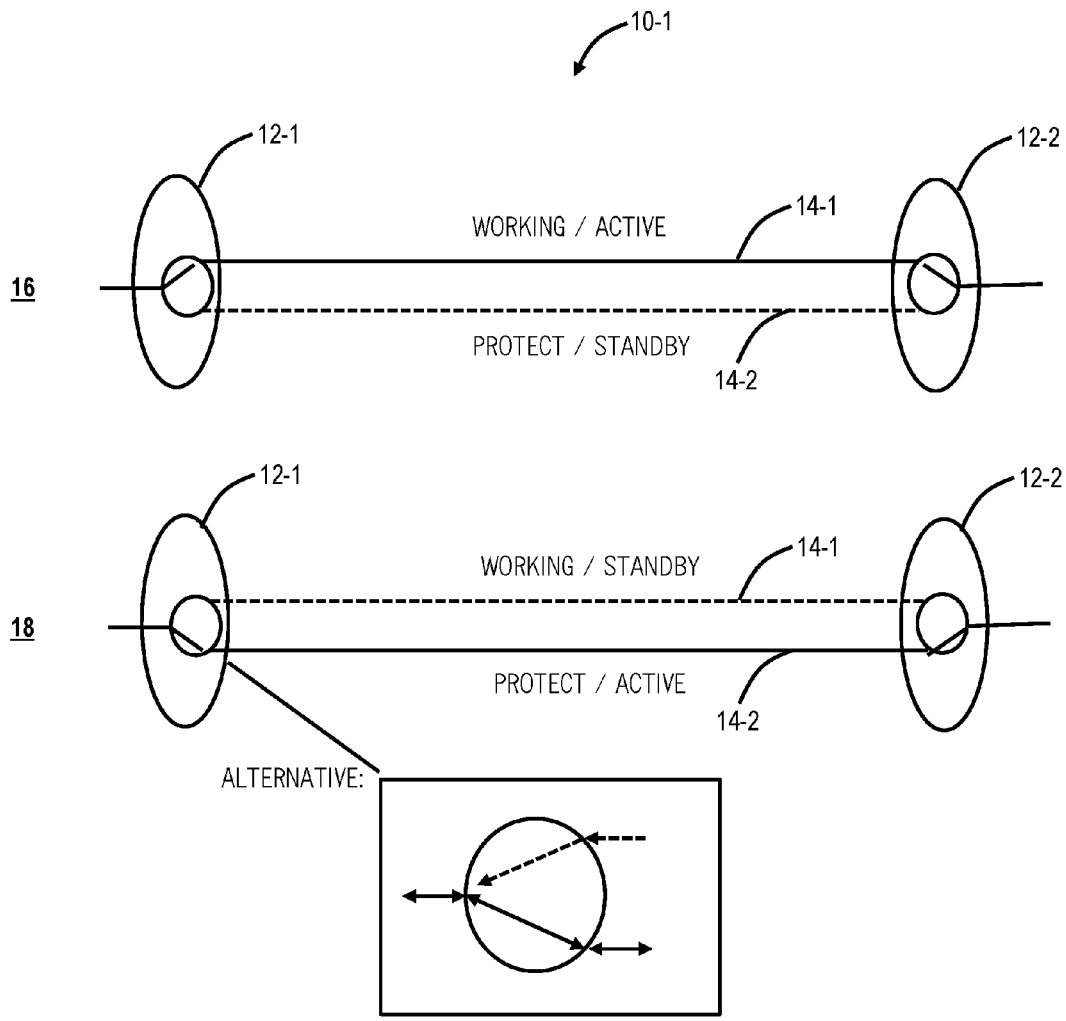
FIG. 3 is a network diagram of a network of two nodes illustrating 1:1 linear protection in various operational states.

Referring to FIG. 3, in an exemplary embodiment, a network diagram illustrates a network 10-1 of two nodes 12-1, 12-2 illustrating 1:1 linear protection in various operational states. The nodes 12-1, 12-2 are interconnected via links 14-1, 14-2. The link 14-1 is designated as a working link, and the link 14-2 is designated as a protect link. These designations of working and protect are static and do not change. The 1:1 linear protection sends a copy of a signal on the working link 14-1 only (this is illustrated in the top half of FIG. 3 as operational state 16), while the protection link 14-2 is reserved for future use in case that the working link 14-1 fails. Only when a failure occurs on the working link 14-1, a preempt operation is carried out to take over the protection link 14-2 to carry the traffic from the failed working link 14-1 (this is illustrated in the bottom half of FIG. 3 as operational state 18). Thus, while the links 14-1, 14-2 are statically designated as working and protect, each can be labeled as active or standby based on a current operational state of the 1:1 linear protection, i.e. the protection link 14-2 is active when the working link 14-1 fails. The 1:1 linear protection generally has better efficiency in the protection capacity usage over 1+1 linear protection; however, it needs an additional action to switch over the traffic, thereby affecting restoration speed.

Figure 4:
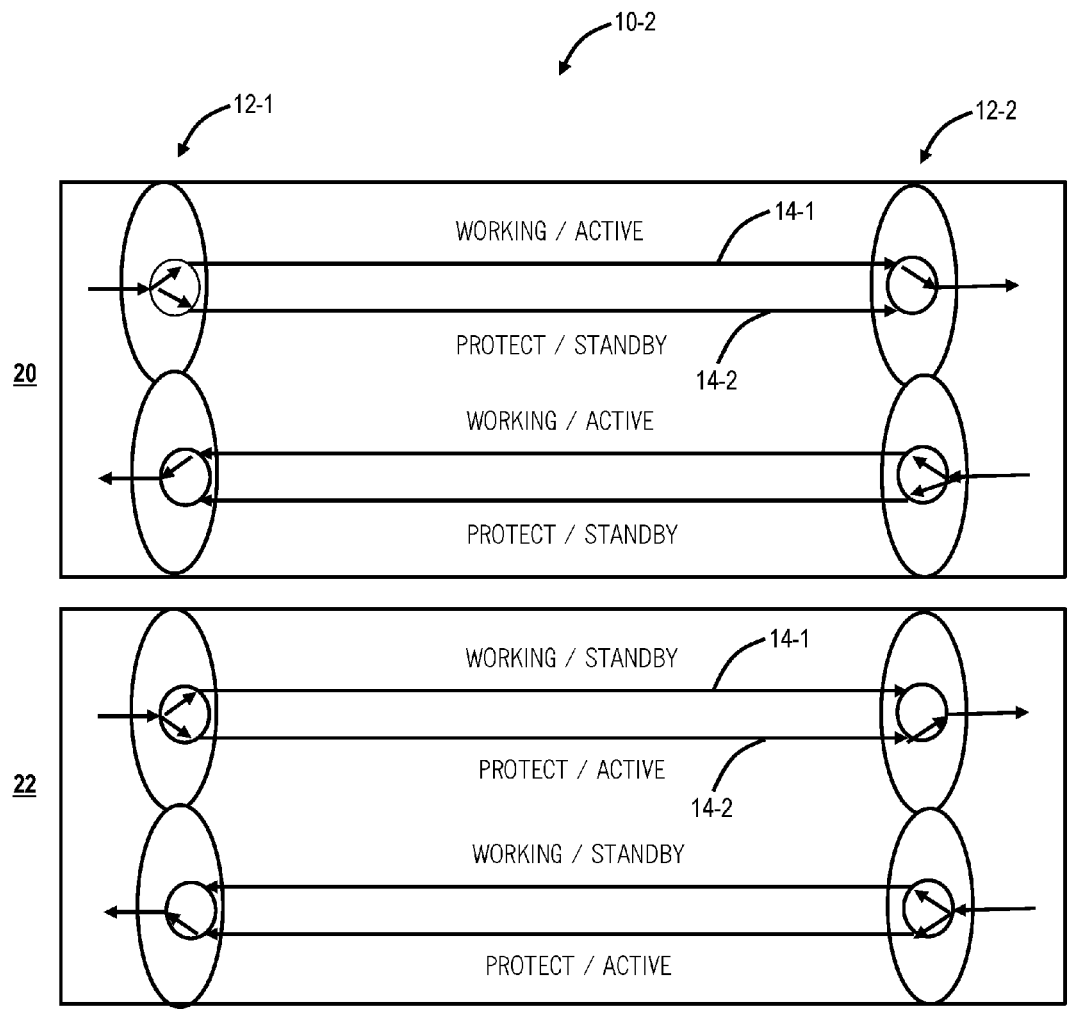
FIG. 4 is a network diagram of a network of two nodes illustrating 1+1 linear protection in various operational states.

Referring to FIG. 4, in an exemplary embodiment, a network diagram illustrates a network 10-2 of two nodes 12-1, 12-2 illustrating 1+1 linear protection in various operational states. Again, the links 14-1, 14-2 are as described in FIG. 3. In the 1+1 linear protection, a copy of a signal is transmitted respectively on the working link 14-1 and the protection link 14-2. At the receiver side, the receiver can make a decision to accept which copy of signal based on the signal quality. In an operational state 20, the working link 14-1 is designated as active and the protect link 14-2 is designated as standby. Two views are shown of the network 10-2 in the operational state 20 to show the receiver action at both the nodes 12-1, 12-2. Conversely, in an operational state 22, the working link 14-1 is designated as standby and the protect link 14-2 is designated as active.

For APS/PSC protocols, each of the nodes 12-1, 12-2 operates a protection (group) state machine with exemplary states including Lockout Protection, Manual Switch (to protection), Signal Fail, etc. and exemplary State transition triggers include Lockout Protection (user request), Manual Switch (to protection), Signal Fail, etc. Note, the states and the state transition triggers have the same list with a specific hierarchy; only higher (in hierarchy) trigger can change state to the trigger level state. When state changes occur, the nodes 12-1, 12-2 send (APS/PSC) signals to the far end for state machine synchronization. As such, any state changes need to be signaled to the far-end to coordinate the protection switching. Triggers can be categorized as commands (e.g., manual switch), faults (e.g., signal fail), or internal events (e.g., wait-to-restore (WTR) timer expires). A command "Release" or "Clear" can release the local command setting and signal "no-request" to the far-end, i.e., no-request signal can release far-end command setting.

Figure 5:
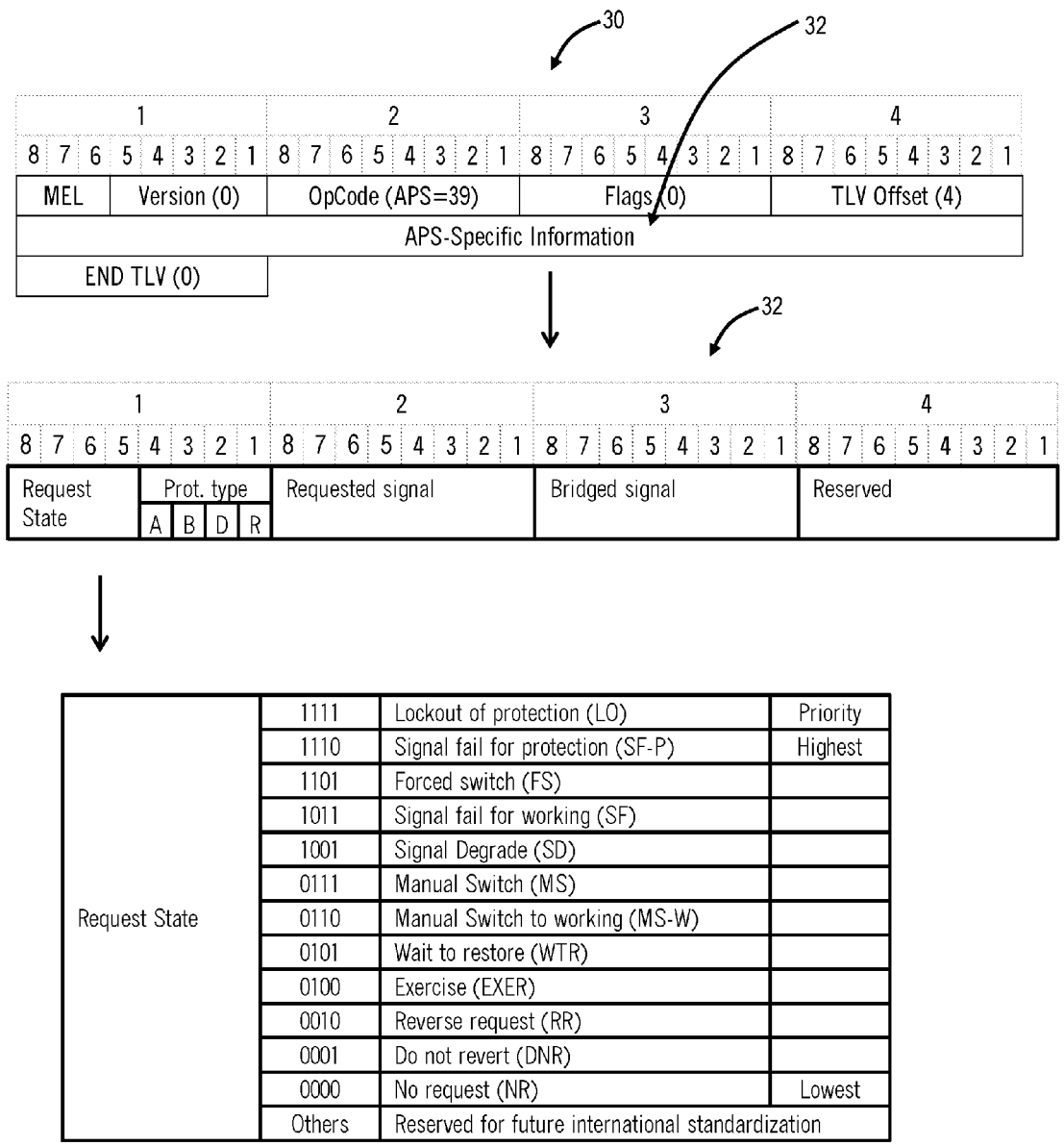
FIGS. 5 and 6 are block diagrams of an exemplary Protocol Data Unit (PDU) for use herein.
Figure 6:
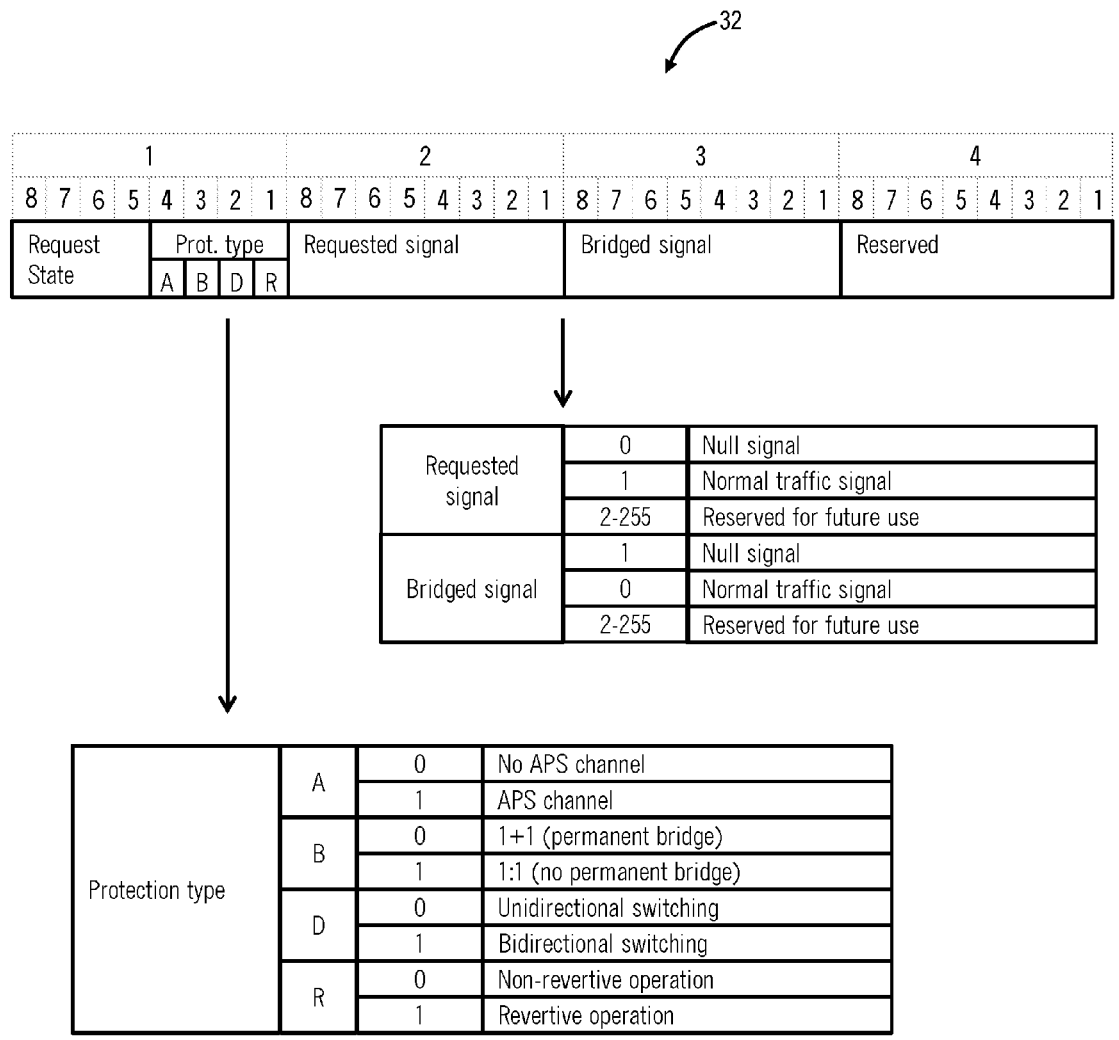

Referring to FIGS. 5 and 6, in an exemplary embodiment, block diagrams illustrate an exemplary PDU 30 for use herein. In an exemplary embodiment, the PDU 30 is an APS PDU according to Y.1731/G.8013 "OAM functions and mechanisms for Ethernet based networks" and Y.1731/G.8031. Specifically, G.8013 defines the MEL, Version, OpCode (APS=39), flags, and TLV offset. G.8031 defines APS specific information 32 which includes Request/State (top-priority global request as per switching algorithm), Protection Type: A (APS or not), B (1:1 or 1+1), D (bi- or uni-directional), R (revertive or not), Requested Signal (signal requested by near end to be carried over Protection), and Bridged Signal (signal bridged by near end over Protection).

Figure 7:
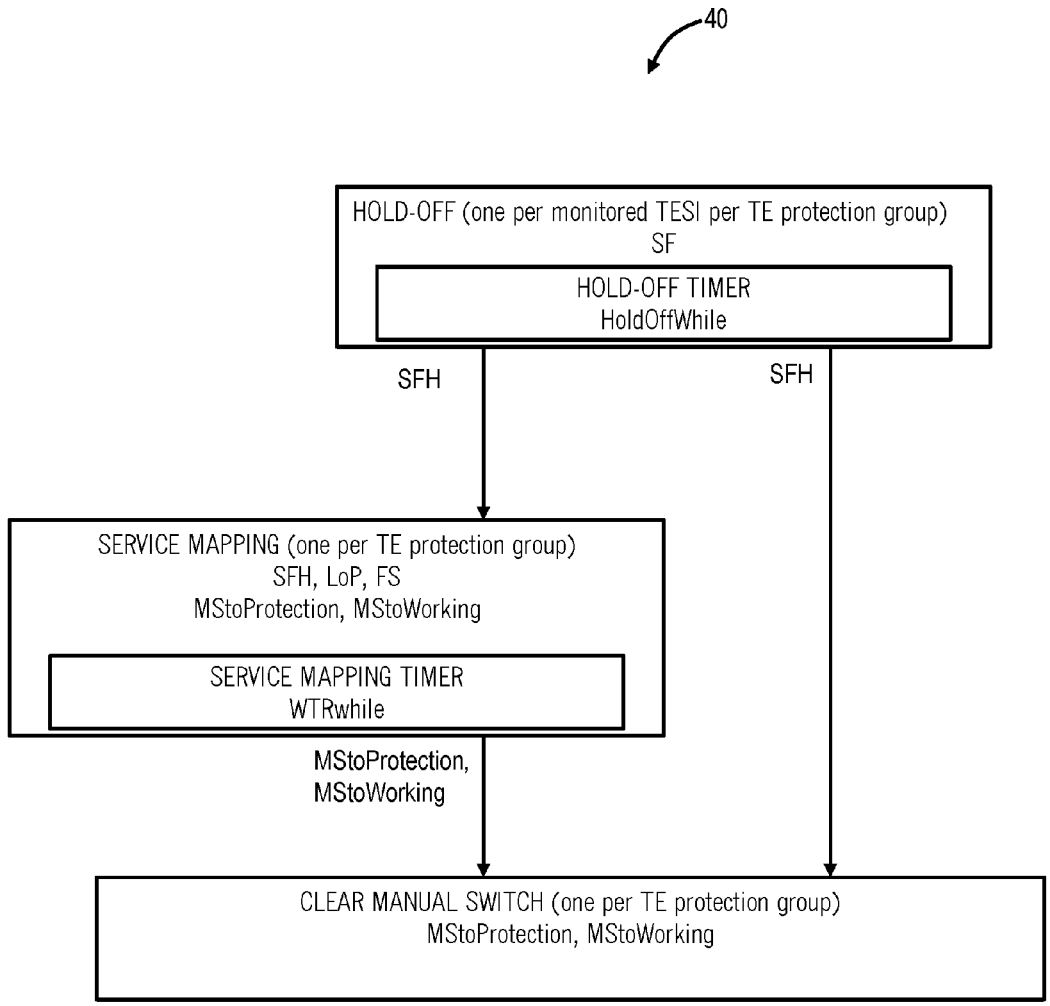
FIG. 7 is a state diagram of a PBB-TE Tunnel Protection State Machine.

Referring to FIG. 7, in an exemplary embodiment, a state diagram illustrates a PBB-TE Tunnel Protection State Machine 40. PBB-TE provides end-to-end linear protection for point-to-point Traffic Engineered Service Instances (TE-SIs), where a dedicated protection point-to-point TESI is established for one particular working point-to-point TESI, and the traffic is automatically switched from the working TESI to the protection TESI when a failure occurs on the working entity. Failure is detected by the operation of the Continuity Check protocol. Switching is achieved by changing the Backbone Service Instance table B-VID entries on the Customer Backbone Ports associated with the TESI MEPs. The following table illustrates a PBB-TE Tunnel Protection Request Hierarchy.

| PRIORITY | REQUEST |
|---|---|
| highest | LoP |
|  | FS |
|  | p.SF |
|  | w.SF |
|  | MStoProtection |
|  | MStoWorking |
|  | WTE |
| lowest | NoRequest |

Figure 8:
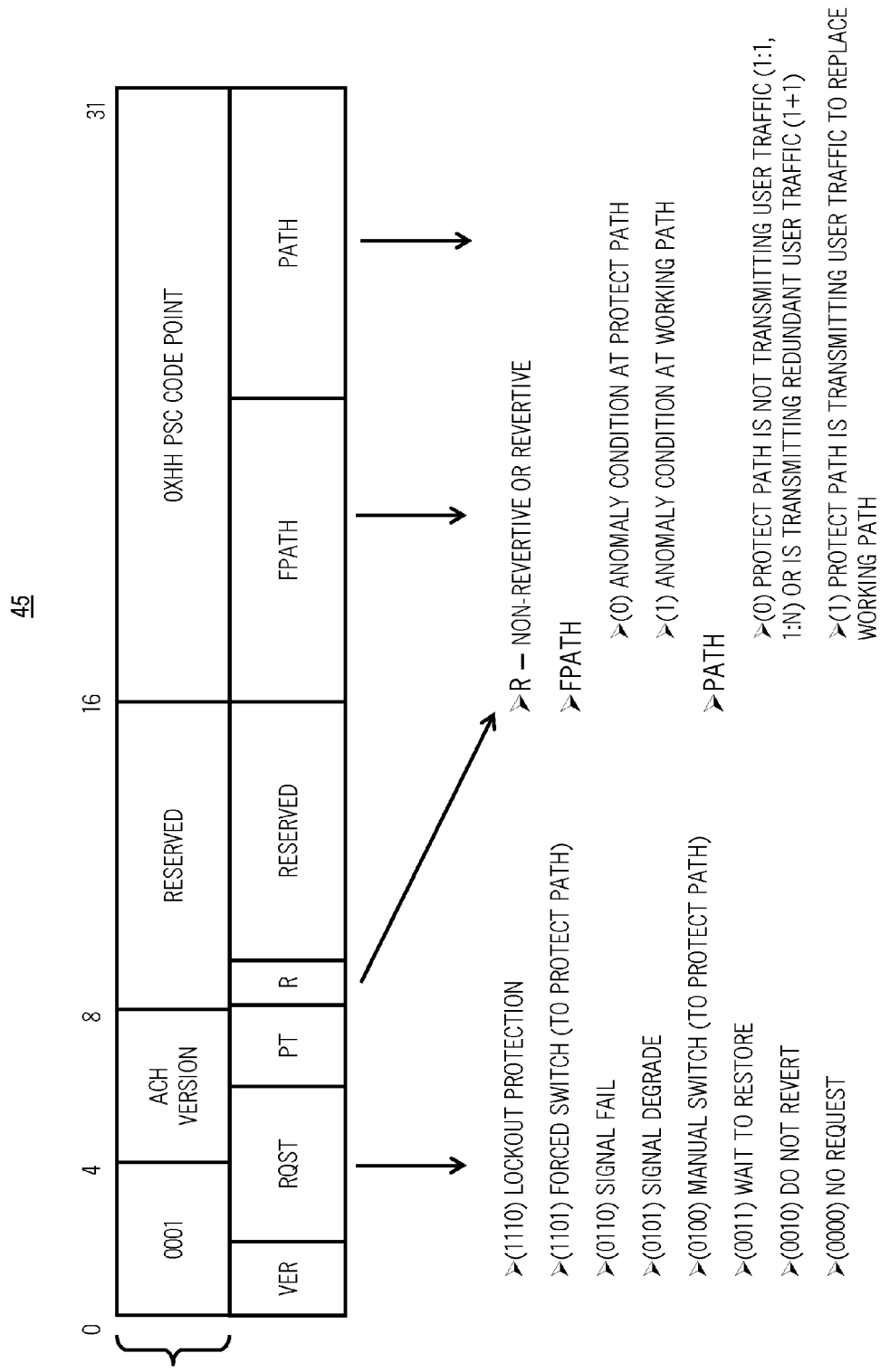
FIG. 8 is a block diagram of a PSC message in the MPLS-TP PSC Protocol.

Referring to FIG. 8, in an exemplary embodiment, a block diagram illustrates a PSC message 45 in the MPLS-TP PSC Protocol. The MPLS-TP PSC Protocol is described in RFC 6378 "MPLS Transport Profile (MPLS-TP) Linear Protection" (October 2011). The PSC message 45 is sent over the Generic Associated Channel (G-Ach) and has the various attributes as shown in FIG. 8.

The following table compares APS and PSC for Protection State/Request:

| G.8031 | 802.1ay | RFC6378 | Notes |
|---|---|---|---|
| LO | LoP | LO | Lock out protection |
| SF-P |  |  | Protection signal fail |
| FS (to P) | FS (to P) | FS (to P) | Force switch to protection |
|  | SF-P |  | Protection signal fail |
| SF (W) | SF-W | SF (P or W) | Working signal fail |
| SD (future) |  | SD | Signal degraded |
| MS (to P) | MS (to P or W) | MS (to P) | Manual switch to protection |
| MS (to W) |  |  | Manual switch to working |
| WTR | WTR | WTR | Wait to restore |
| EX |  |  | Exercise |
| RR |  |  | Revert request |
| DNR |  | DNR | Do not revert |
| NR | NR | NR | No request |

The following table compares APS and PSC for Other fields:

| G.8031 | RFC6378 | Notes |
|---|---|---|
| *Requested Signal = 0 | Fpath = 0 | Protection is abnormal |
| *Requested Signal = 1 | Fpath = 1 | Working is abnormal |
| Bridged Signal = 0 | Path = 0 | Protection not Tx for 1:1 or Tx for 1 + 1 |
| Bridged Signal = 1 | Path = 1 | Protection signal fail |
| R = 0 | R = 0 | Non revertive |
| R = 1 | R = 1 | Revertive |
| A = 0 |  | No APS |
| A = 1 |  | APS |
| B = 0 |  | 1 + 1 |
| B = 1 |  | 1:1 |
| C = 0 |  | Unidirectional |
| C = 1 |  | Bidirectional |
|  | PT = 00 | Bidirectional switching using a permanent bridging |
|  | PT = 01 | Bidirectional switching using a selector bridging |
|  | PT = 10 | Uidirectional switching using a permanent bridge |

The following table compares RFC 6718 Dual Home 1:1 PW Status Signaling. The PW status signaling is not as close as the other APS protocols. It does provide which PW is active and which PW has a fault but does not incorporate the manual commands, or device internal events.

| Field | Size | Description |
|---|---|---|
| Res | 2-bits | Set to zero |
| Type | 14-bits | Set 0x096A to indicate PW status TLV type |
| Length | 16-bits | Set to 4 to indicate the length of status code to be 4 octets |
| Status code | 32-bits | 0x00000000 = PW forwarding |
|  |  | 0x00000001 = PW not forwarding |
|  |  | 0x00000002 = Local AC Rx fault - Cannot RCV from AC |
|  |  | 0x00000004 = Local AC Tx fault - Cannot send over AC |
|  |  | 0x00000008 = PW Rx fault - Cannot RCV from PW |
|  |  | 0x00000010 = PW Tx fault - Cannot send over PW |
|  |  | Only value zero and one is supported. |

As can be seen from the foregoing, APS (G.8031), PBB-TE Tunnel Protection (IEEE 802.1ay), MPLS-TP PSC (RFC 6378), and 1:1 PW (RFC 6718), i.e. existing linear packet protection protocols, have similar status signaling and state machines. It is an intent of the packet network linear protection systems and methods to provide a generic mechanism to utilize these existing linear packet protection protocols and other protocols in a dual home or multi-home configuration. The following descriptions of 1:1 Linear Protection and 1+1 Linear Protection describe the packet network linear protection systems and methods with reference to APS or PSC, but those of ordinary skill in the art will recognize this can be used with any linear packet protection protocol. Generally, the packet network linear protection systems and methods provide a coordination algorithm between the dual or multi-home nodes such that their state machines can be synchronized. It is noted that in all of the existing linear packet protection protocols described herein, state machine synchronization is not necessary since these protocols operate in a single home configuration, i.e. two nodes receive both the working and the protect links. In the dual home or multi-home configuration, different nodes receive the working and the protect links. Thus, the packet network linear protection systems and methods require a coordination between the different nodes; something that is not addressed in the existing linear packet protection protocols described herein. Note, RFC 6718 for PW redundancy does not have the protection switching hierarchy like PSC/APS, and includes additional status signaling for traffic forwarding in active or standby states (in addition to the table listed above for RFC 6718).

Packet Network Linear Protection Method in Dual or Multi-Home Configurations

Figure 9:
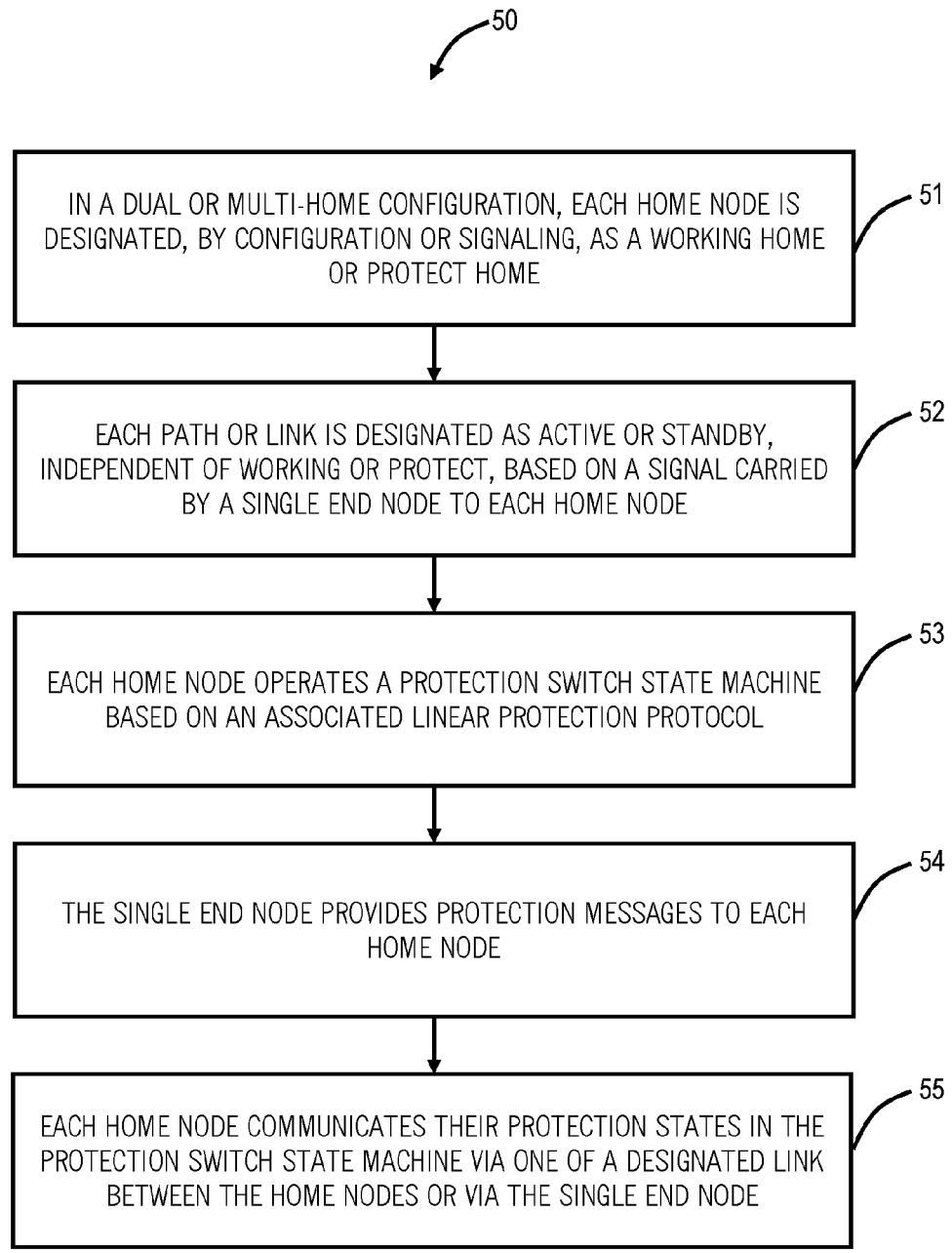
FIG. 9 is a flowchart of a packet network linear protection method in a dual or multi-home configuration.

Referring to FIG. 9, in an exemplary embodiment, a flowchart illustrates a packet network linear protection method 50 in a dual or multi-home configuration. The packet network linear protection method 50 extends existing linear packet protection protocols, such as APS (G.8031), PBB-TE Tunnel Protection (IEEE 802.1ay), MPLS-TP PSC (RFC 6378), and 1:1 PW, to dual or multi-home configurations. For example, the packet network linear protection method 50 can be operated between a single end node, e.g. node A in FIG. 2, and dual home nodes (e.g., nodes B, C in FIG. 2) or multiple home nodes. The packet network linear protection method 50 includes, in a dual or multi-home configuration, designating each home node, by configuration or signaling, as a working home or a protect home (step 51). Note, this designation is static and does not change based on an operational state. This is not presently done in existing linear protection protocols.

The packet network linear protection method 50 includes designating each path or link as active or standby, independent of working or protect, based on a signal carried by a single end node to each home node (step 52). Each path or link connects the single end node to each associated home node. The packet network linear protection method 50 includes operating a protection switch state machine based on an associated linear protection protocol at each home node (step 53). The packet network linear protection method 50 includes providing protection messages to each home node, based on the associated linear protection protocol, from the single end node (step 54). Again, as can be seen from the foregoing, APS (G.8031), PBB-TE Tunnel Protection (IEEE 802.1ay), MPLS-TP PSC (RFC 6378), and 1:1 PW (RFC 6718), i.e. existing linear packet protection protocols, have similar status signaling and state machines. The packet network linear protection method 50 provides the appropriate protection messages related to status signaling and state machines between the single end node and each home node. The packet network linear protection method 50 includes communicating by each home node their protection states in the protection switch state machine via one of a designated link between the home nodes or via the single end node (step 55). Note, without the designated link, the protection states can become out of sync until communication is back between all home nodes and the single end node. However, this does not affect operation in the event of a fault.

With the appropriate communication and synchronization between the end node and the home nodes, the packet network linear protection method 50 allows specific actions to be taken at the end node and the homes nodes to implement 1:1 or 1+1 protection according to the associated linear protection protocol. Note, conventionally, the various linear protection protocols described herein are single homed, i.e. the end node is connected to a complementary end node (again, see FIG. 1). With the packet network linear protection method 50, the associated linear protection protocol can now operate similar to a linear add-drop multiplexer (ADM) configuration where a protection switch can occur between one end node and home nodes, and not necessarily between the other end node and associated home nodes.

1:1 Linear Protection

Figure 10:
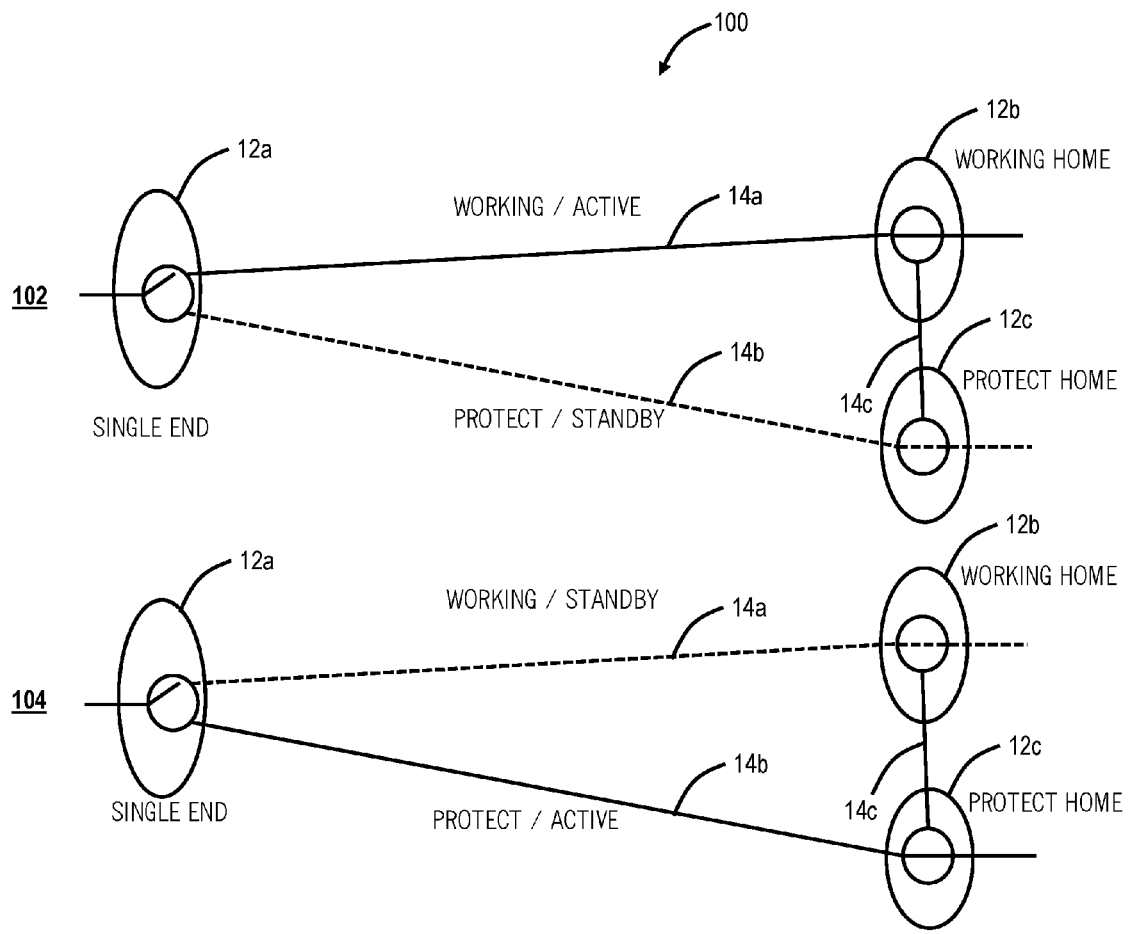
FIG. 10 is a network diagram of a portion of a network with an end node connected to dual-homed nodes utilizing the packet network 1:1 linear protection systems and methods and with a designated link between the dual-homed nodes.
Figure 11:
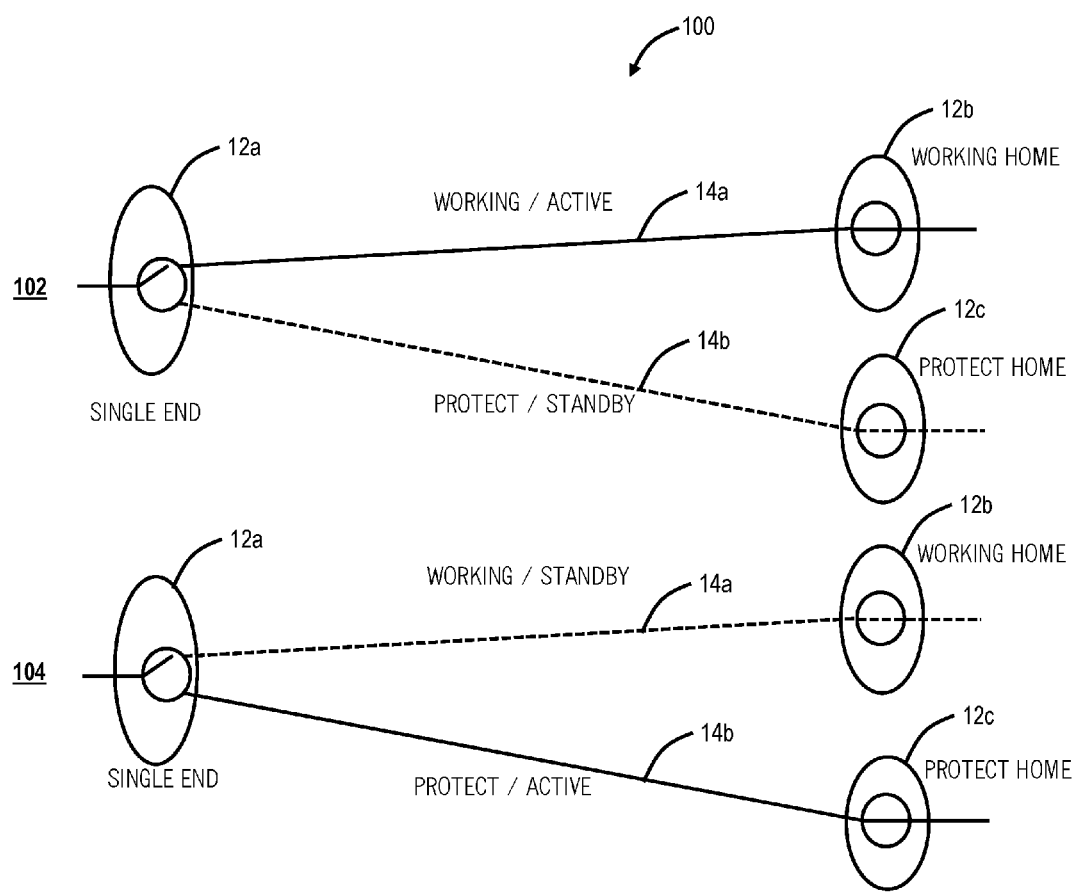
FIG. 11 is a network diagram of a portion of a network with an end node connected to dual-homed nodes utilizing the packet network 1:1 linear protection systems and methods and without a designated link between the dual-homed nodes.

Referring to FIGS. 10 and 11, in an exemplary embodiment, network diagrams illustrate a portion of a network 100 with an end node 12a connected to dual-homed nodes 12b, 12c utilizing 1:1 linear protection and the packet network linear protection systems and methods. Specifically, comparing FIGS. 10 and 11 to FIG. 2, the end node 12a corresponds to the network element A and the nodes 12b, 12c correspond to the network elements B, C, respectively. While the following descriptions are illustrated with reference to a dual-home configuration, those of ordinary skill in the art will recognize the packet network linear protection systems and methods can be extended to multi-home configurations. In both FIGS. 10 and 11, the end node 12a connects to the dual-homed node 12b via a link 14a designated as the working link and to the dual-home node 12c via a link 14b designated as the protection link. FIG. 10 further includes a designated link 14c connecting the dual-homed nodes 12b, 12c whereas FIG. 10 does not include the designated link 14c. The packet network linear protection systems and methods contemplate operation both with and without the designated link 14c. Again, in both FIGS. 10 and 11, in an operational state 102, the working link 14a is active and the protect link 14b is standby, and, in an operational state 104, the working link 14a is standby and the protect link 14b is active.

In various exemplary embodiments, the packet network linear protection systems and methods adapt existing 1:1 linear protection protocols described herein such that each of the dual-homed nodes 12b, 12c knows the configured (or administrative) role of the transport path to the end node 12a, i.e. working member or protect member. Of note, none of the current linear protection protocols described herein provide this. For designation, assume the node 12b is defined as the working home and the node 12c is defined as the protect home. This can be done by configuration or by signaling. Each of the homes has only one transport path: active or standby, which is independent of working or protect. That is, the designation of working home and protect home is static whereas the designation of active or standby is dependent of the operational state. Each transport path needs to carry a signal initiated by the end node 12a, indicating it is the active or standby path. All existing protocols have this indication as described herein.

Each of the nodes 12b, 12c run the protection switch state machine, and the end node 12a sends APS/PSC messages to both of the nodes 12b, 12c. The Working and Protect Homes, i.e. the nodes 12b, 12c, can communicate Protection States using the designated link 14c between the two homes, or APS/PSC messages via the end node 12a. Without the designated link 14c between two homes, if one transport path has fault, that Home's Protection State Machine could be out of sync, until the communication is back. This also covers the protection switching coordination when the triggers external to the Dual Homes, e.g., Virtual Router Redundancy Protocol (VRRP), etc.

Figure 12:
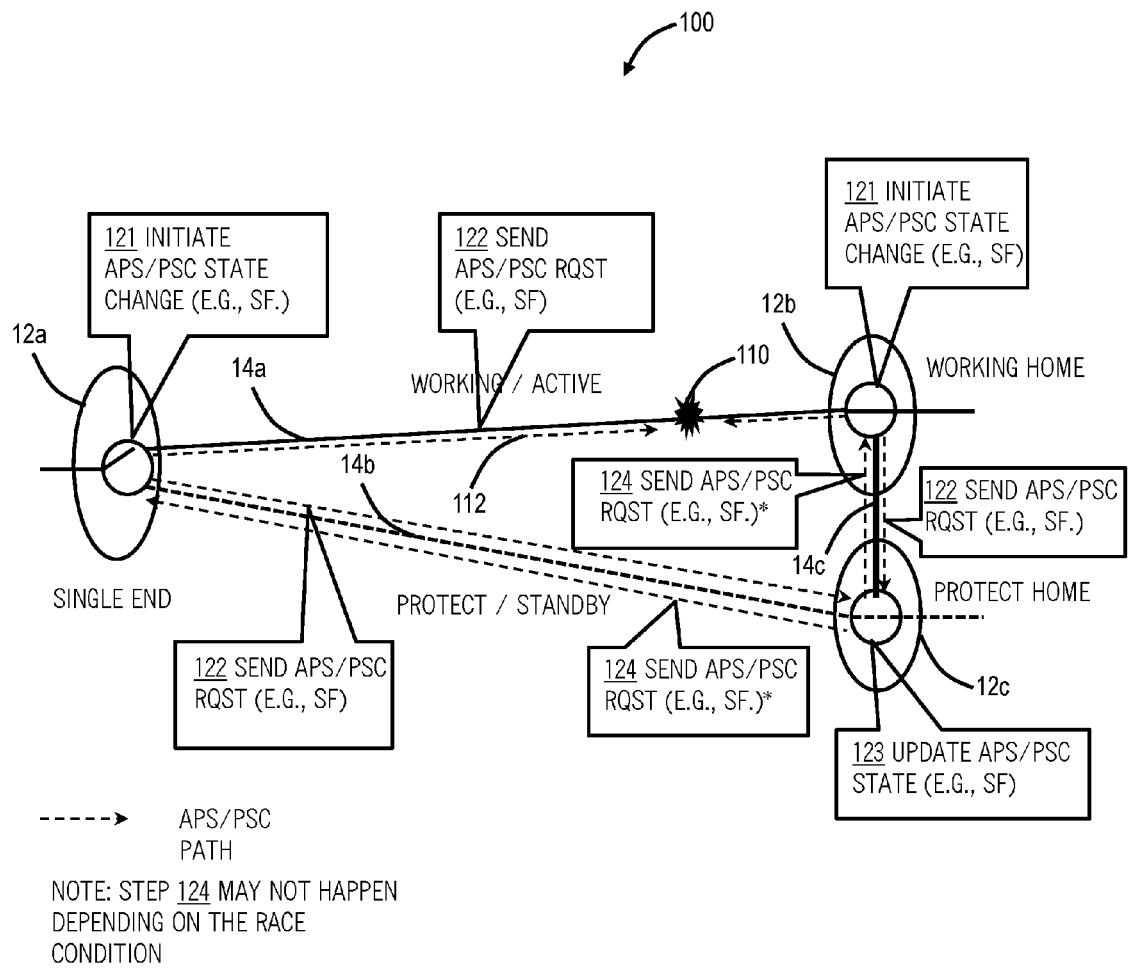
FIG. 12 is a network diagram of the network of FIG. 10 and an exemplary operation (signal fail) of the packet network 1 linear protection method of FIG. 9 with 1:1 protection.

Referring to FIG. 12 in an exemplary embodiment, a network diagram illustrates the network 100 and an exemplary operation (signal fail) of the packet network linear protection method 50. Specifically, the exemplary operation of FIG. 12 is shown on the network 100 of FIG. 10 with a fault 110 on the working link 14a. A dotted line illustrates a path of protection messages 112, such as APS or PSC messages. Subsequent to the fault 110, the end node 12a and the node 12b initiate an APS/PSC state change (e.g., signal fail (SF)) in their protection switch state machine (step 121). The end node 12a and the node 12b send protection messages 112 for an APS/PSC request (step 122). Specifically, the end node 12*a* transmits the protection messages 112 to the node 12*b* (which are blocked by the fault 110) and the node 12*c*. The node 12*b* transmits the protection messages 112 to the end node 12*a* (which are blocked by the fault 110) and the node 12*c* via the designated link 14*c*. The node 12*c*, upon receiving the protection messages 112 from either the end node 12*a* or the node 12*b*, updates its APS/PSC state in its protection switch state machine (step 123). Finally, the node 12*c* sends an APS/PSC request via the protection messages to the end node 12*a* or the node 12*b* (step 124). Note, the step 124 may not happen depending on the race condition. At this point, the protection switch state machines are synchronized between the nodes 12*a*, 12*b*, 12*c*, and the protect link 12*b* can become active.

Figure 13:
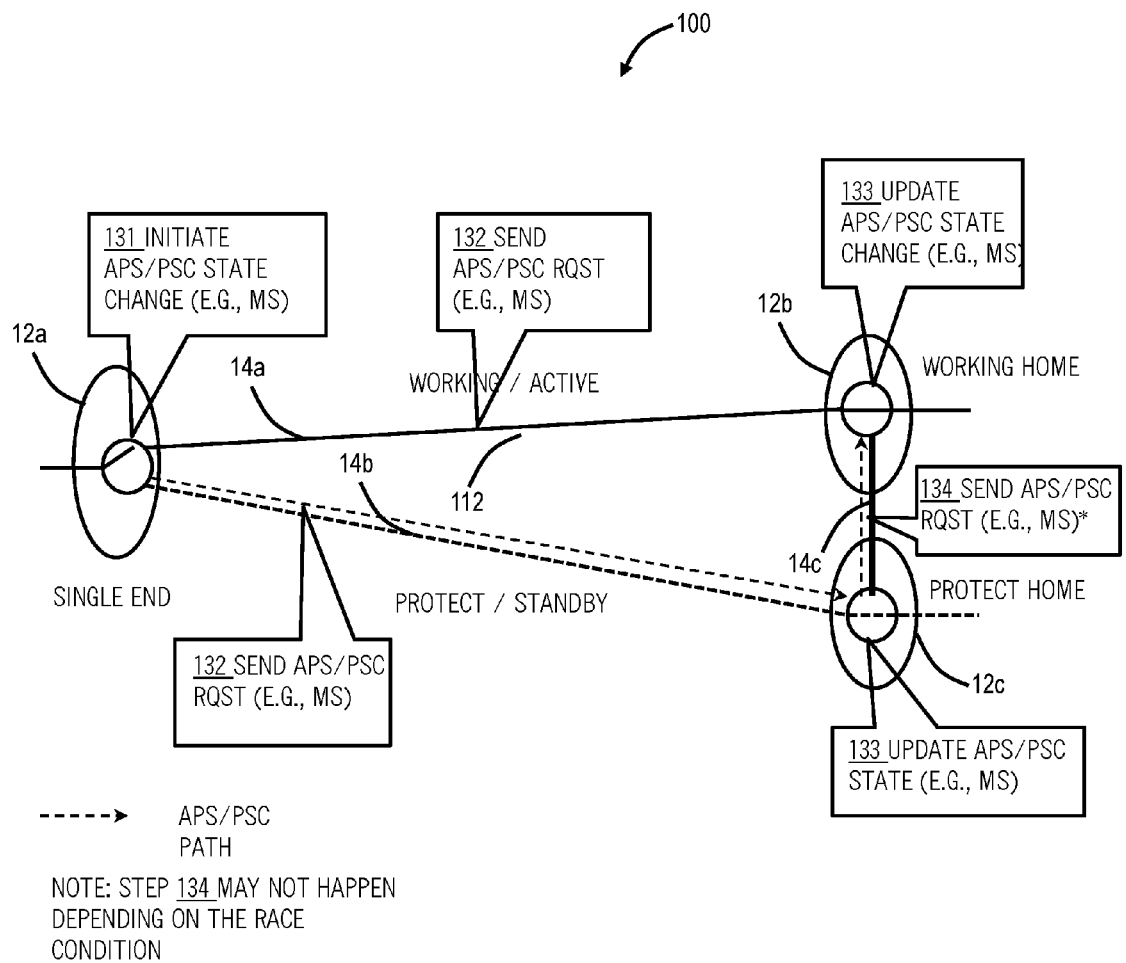
FIG. 13 is a network diagram of the network of FIG. 10 and an exemplary operation (manual switch from the end node) of the packet network linear protection method of FIG. 9 with 1:1 protection.

Referring to FIG. 13, in an exemplary embodiment, a network diagram illustrates the network 100 and an exemplary operation (manual switch from the end node 12*a*) of the packet network linear protection method 50. A dotted line illustrates a path of protection messages 112, such as APS or PSC messages. The end node 12*a* initiates an APS/PSC state change for a manual switch (MS) (step 131) updating its protection switch state machine. The end node 12*a* sends protection messages 112 for an APS/PSC request (MS) to the nodes 12*b*, 12*c* (step 132). The nodes 12*b*, 12*c* update an APS/PSC state change (MS) in their protection switch state machine (step 133). Optionally, the node 12*c* send an APS/PSC request (MS) to the node 12*b* via the designated link 14*c* (step 134).

Figure 14:
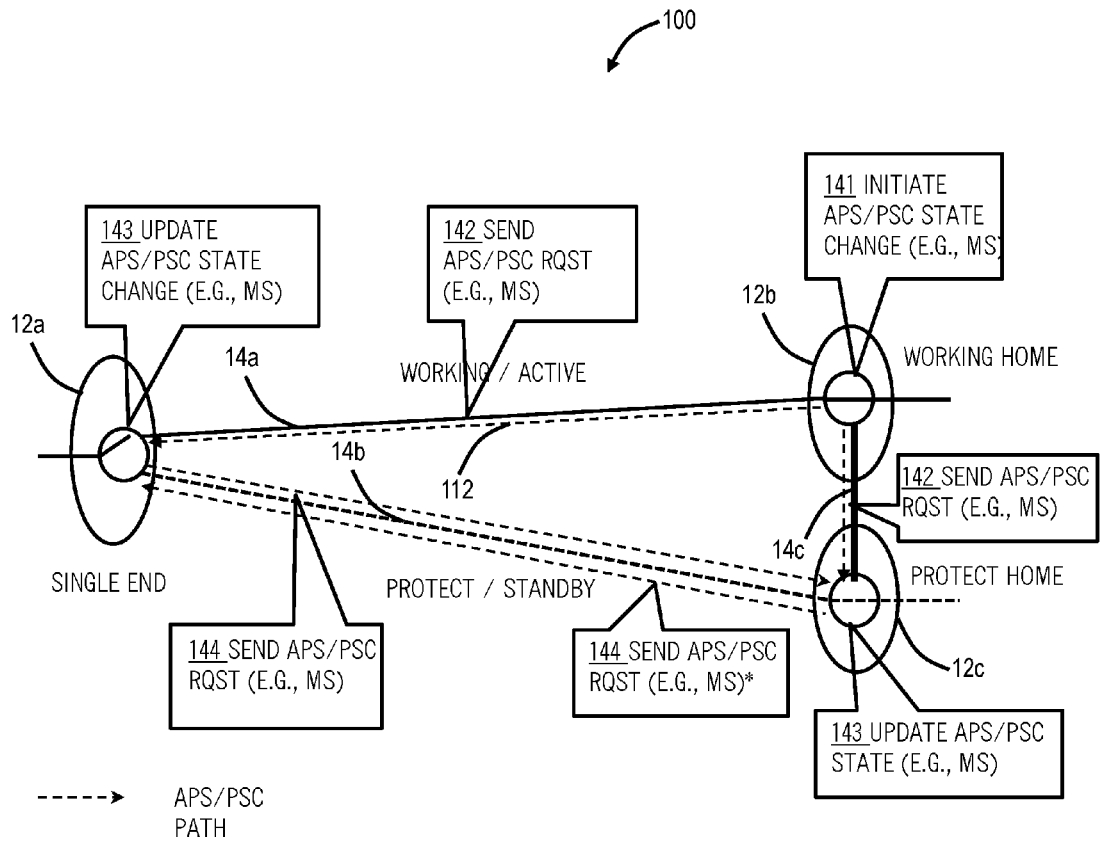
FIG. 14 is a network diagram of the network of FIG. 10 and an exemplary operation (manual switch from a home node) of the packet network linear protection method of FIG. 9 with 1:1 protection.

Referring to FIG. 14, in an exemplary embodiment, a network diagram illustrates the network 100 and an exemplary operation (manual switch from the node 12*b*) of the packet network linear protection method 50. A dotted line illustrates a path of protection messages 112, such as APS or PSC messages. The node 12*b* initiates an APS/PSC state change (MS) updating its protection switch state machine (step 141). The node 12*b* sends protection messages 112 for an APS/PSC request (MS) to the end node 12*a* and the node 12*c* via the designated link 14*c* (step 142). The end node 12*a* and the node 12*c* update their APS/PSC state change (MS) (step 143). Optionally, the end node 12*a* and the node 12*c* send an APS/PSC request (MS) (step 144).

Figure 15:
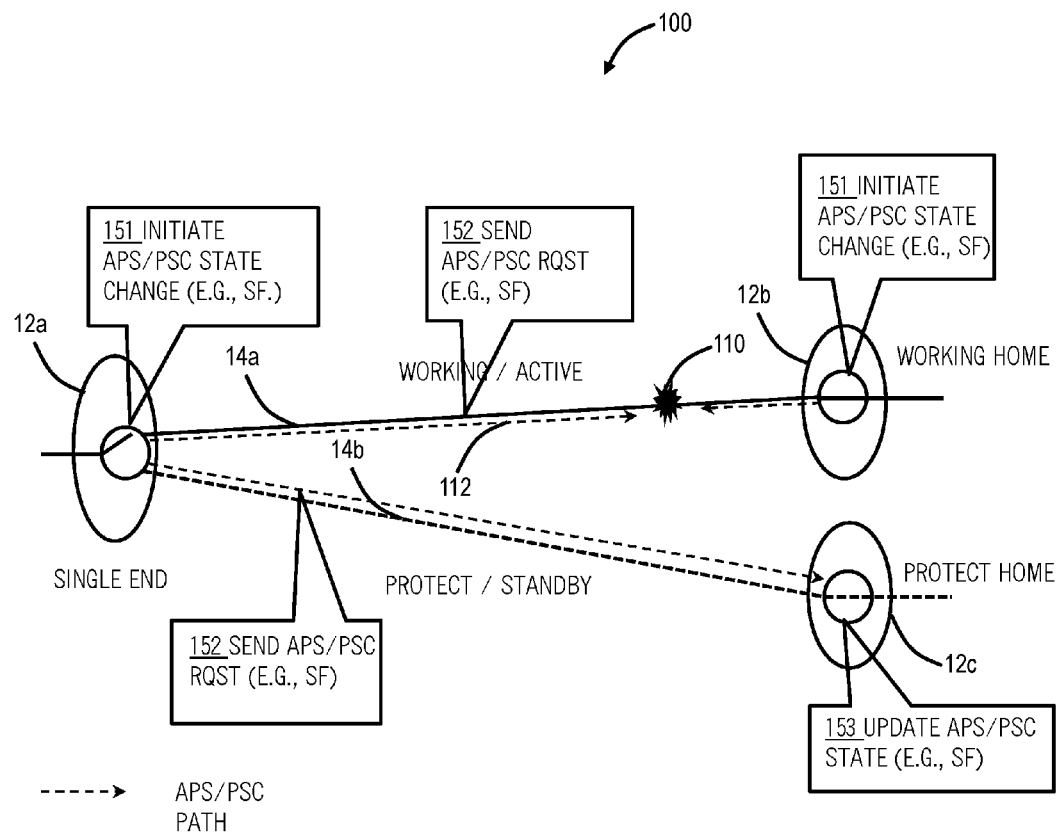
FIG. 15 is a network diagram of the network of FIG. 11 and an exemplary operation (signal fail) of the packet network linear protection method of FIG. 9 with 1:1 protection.

Referring to FIG. 15, in an exemplary embodiment, a network diagram illustrates the network 100 and an exemplary operation (signal fail) of the packet network linear protection method 50. Specifically, the exemplary operation of FIG. 12 is shown on the network 100 of FIG. 11 with a fault 110 on the working link 14*a*. A dotted line illustrates a path of protection messages 112, such as APS or PSC messages. Subsequent to the fault 110, the end node 12*a* and the node 12*b* initiate an APS/PSC state change (e.g., signal fail (SF)) in their protection switch state machine (step 151). The end node 12*a* and the node 12*b* send protection messages 112 for an APS/PSC (SF) request (step 152). Specifically, the end node 12*a* transmits the protection messages 112 to the node 12*b* (which are blocked by the fault 110) and the node 12*c*. The node 12*b* transmits the protection messages 112 to the end node 12*a* (which are blocked by the fault 110). The node 12*c*, upon receiving the protection messages 112 from the end node 12*a* updates its APS/PSC state in its protection switch state machine (step 153). In case Working Home APS/PSC state is out of sync at the node 12*b* (e.g., after the fault, Single End changes APS/PSC state to lockout), it will be in sync after the fault is cleared. However, this does not affect operation since the nodes 12*a*, 12*c* correctly note the fault 110 and operate the protect link 14*b* as active.

Figure 16:
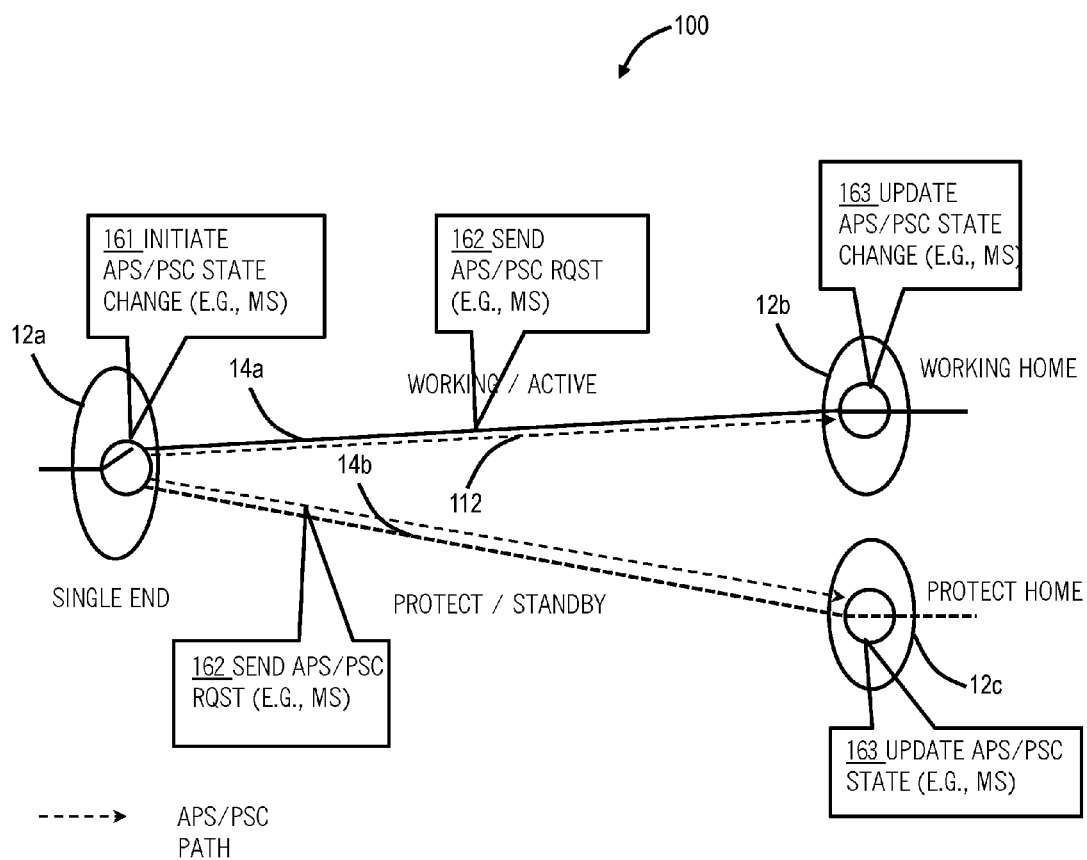
FIG. 16 is a network diagram of the network of FIG. 11 and an exemplary operation (manual switch from the end node) of the packet network linear protection method of FIG. 9 with 1:1 protection.

Referring to FIG. 16, in an exemplary embodiment, a network diagram illustrates the network 100 and an exemplary operation (manual switch from the end node 12*a*) of the packet network linear protection method 50. A dotted line illustrates a path of protection messages 112, such as APS or PSC messages. The end node 12*a* initiates an APS/PSC state change for a manual switch (MS) (step 161) updating its protection switch state machine. The end node 12*a* sends protection messages 112 for an APS/PSC request (MS) to the nodes 12*b*, 12*c* (step 162). The nodes 12*b*, 12*c* update an APS/PSC state change (MS) in their protection switch state machine (step 163).

Figure 17:
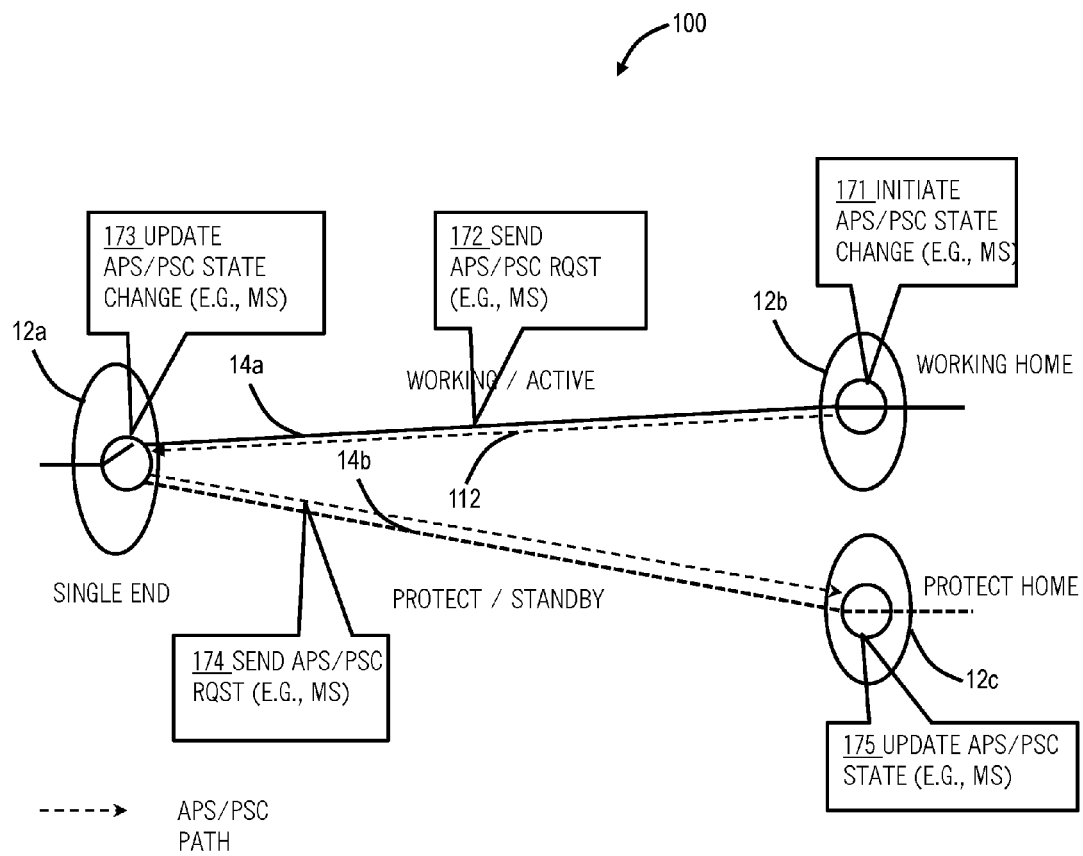
FIG. 17 is a network diagram of the network of FIG. 11 and an exemplary operation (manual switch from a home node) of the packet network linear protection method of FIG. 9 with 1:1 protection.

Referring to FIG. 17, in an exemplary embodiment, a network diagram illustrates the network 100 and an exemplary operation (manual switch from the node 12*b*) of the packet network linear protection method 50. A dotted line illustrates a path of protection messages 112, such as APS or PSC messages. The node 12*b* initiates an APS/PSC state change (MS) (step 171). The node 12*b* sends an APS/PSC request (MS) to the end node 12*a* (step 172). The end node 12*a* updates is APS/PSC state change (MS) (step 173) and sends an APS/PSC request (MS) to the node 12*c* (step 174) and the node 12*c* updates its APS/PSC state (MS) (step 175).

Each of FIGS. 10-17 relate to dual home 1:1 linear protection using APS/PSC. This can utilizes other linear protection protocols. Note that the only difference between having the designated link 14*c* between the two home nodes 12*b*, 12*c* relative to not having this link: one of the home nodes 12*b*, 12*c* could be out of APS/PSC state sync until the communication is back. Since the link has fault in this case, all traffic and APS/PSC PDUs will be using the path between end node 12*a* and another home, without protection, APS/PSC state out of sync in the isolated home will not have impact to the service traffic. Also noticed that the APS/PSC state machine will discard the duplicated APS/PSC requests (the same as non "higher" request). Therefore extra duplicated APS/PSC PDUs received from different ends will not cause different state change results.

1+1 Linear Protection

Figure 18:
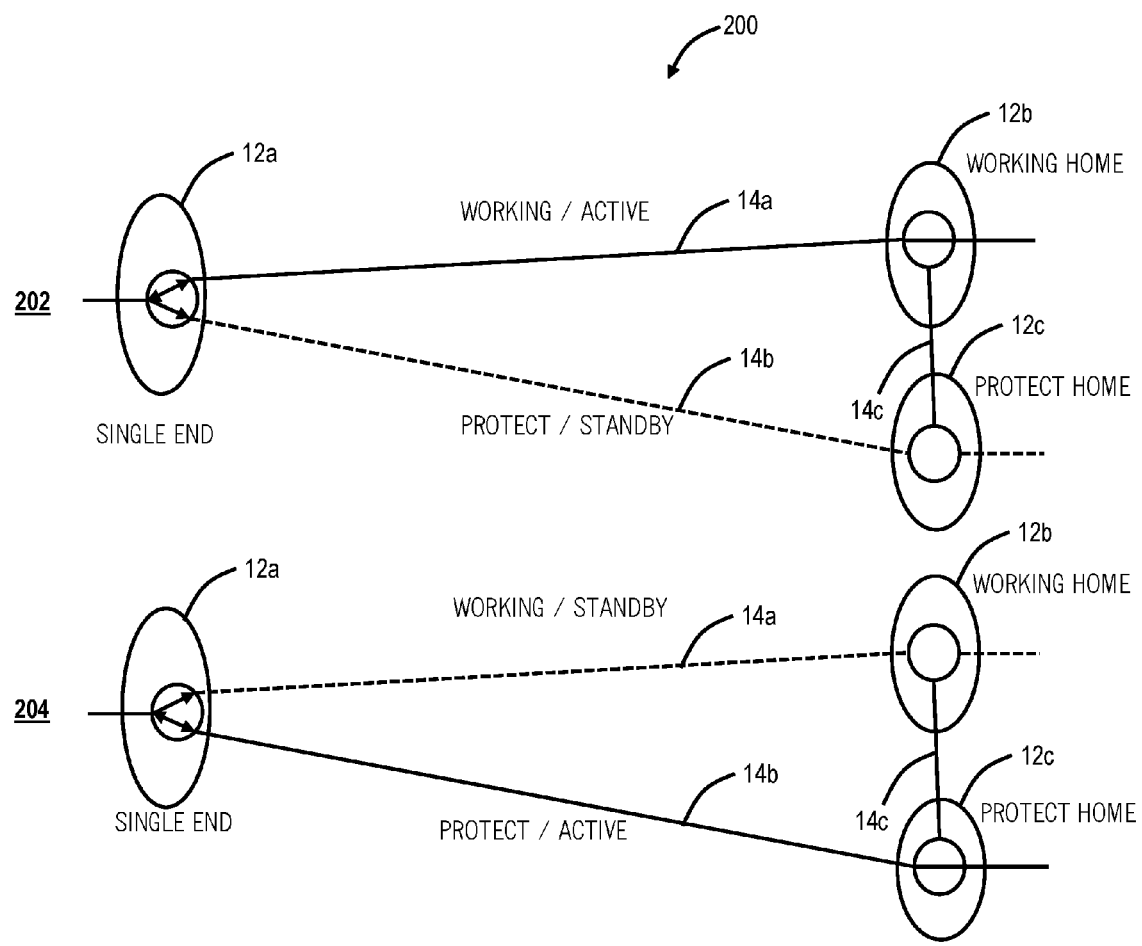
FIG. 18 is a network diagram of a portion of a network with an end node connected to dual-homed nodes utilizing the packet network 1+1 linear protection systems and methods and with a designated link between the dual-homed nodes.
Figure 19:
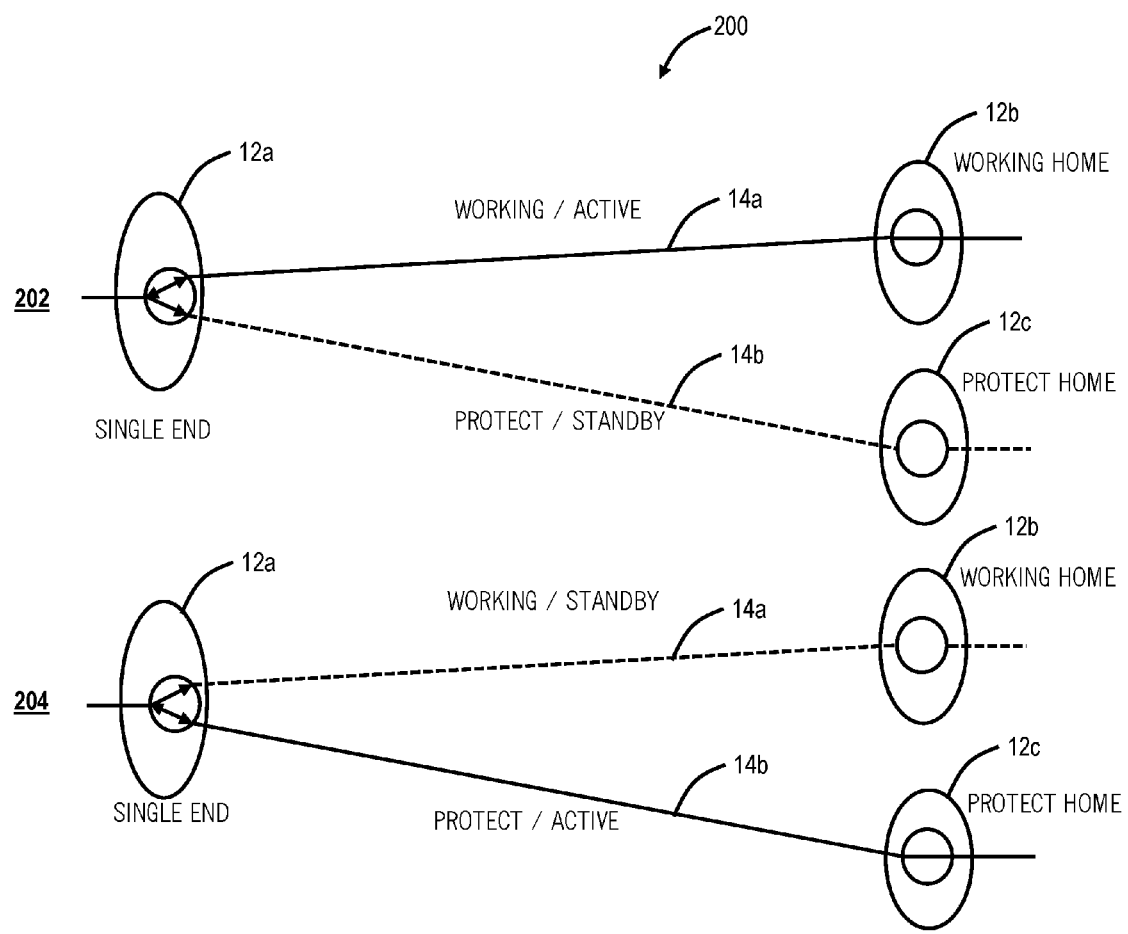
FIG. 19 is a network diagram of a portion of a network with an end node connected to dual-homed nodes utilizing the packet network 1+1 linear protection systems and methods and without a designated link between the dual-homed nodes.

Referring to FIGS. 18 and 19, in an exemplary embodiment, network diagrams illustrate a portion of a network 100 with an end node 12*a* connected to dual-homed nodes 12*b*, 12*c* utilizing 1+1 linear protection and the packet network linear protection systems and methods. Specifically, comparing FIGS. 18 and 19 to FIG. 2, the end node 12*a* corresponds to the network element A and the nodes 12*b*, 12*c* correspond to the network elements B, C, respectively. While the following descriptions are illustrated with reference to a dual-home configuration, those of ordinary skill in the art will recognize the packet network linear protection systems and methods can be extended to multi-home configurations. Note, FIGS. 18 and 19 correspond to FIGS. 10 and 11, respectively, showing 1+1 linear protection whereas FIGS. 10 and 11 show 1:1 linear protection. In both FIGS. 18 and 19, the end node 12*a* connects to the dual-homed node 12*b* via a link 14*a* designated as the working link and to the dual-home node 12*c* via a link 14*b* designated as the protection link. FIG. 18 further includes a designated link 14*c* connecting the dual-homed nodes 12*b*, 12*c* whereas FIG. 19 does not include the designated link 14*c*. The packet network linear protection systems and methods contemplate operation both with and without the designated link 14*c*. Again, in both FIGS. 18 and 19, in an operational state 202, the working link 14*a* is active and the protect link 14*b* is standby, and, in an operational state 204, the working link 14*a* is standby and the protect link 14*b* is active.

In various exemplary embodiments, the packet network linear protection systems and methods adapt existing 1+1 linear protection protocols described herein. Each of the home nodes 12b, 12c has only one transport path: working or protect. The end node 12a transmits traffic on both paths but receives (by selection) traffic only from one path (the active path). Each of the home nodes 12b, 12c needs to know the role of the transport path: working member, or protect member. This can be done as described herein. Thus, the home nodes 12b, 12c can be designated as working home or protect home. The protect home may drop the receiving traffic from end node 12a, depending on the deployment scenarios. Again, each of the home nodes 12b, 12c runs their protection switch state machine. The end node 12a send protection messages, e.g. APS/PSC, to both of the home nodes 12b, 12c. The working and protect homes can communicate Protection States using APS/PSC via the end node 12a. Without the designated link 14c between the home nodes 12b, 12c, if one transport path has fault, that Home's Protection State Machine could be out of sync, until the communication is back. This also covers the protection switching coordination when the triggers external to the Dual Homes, e.g., VRRP, etc.

Figure 20:
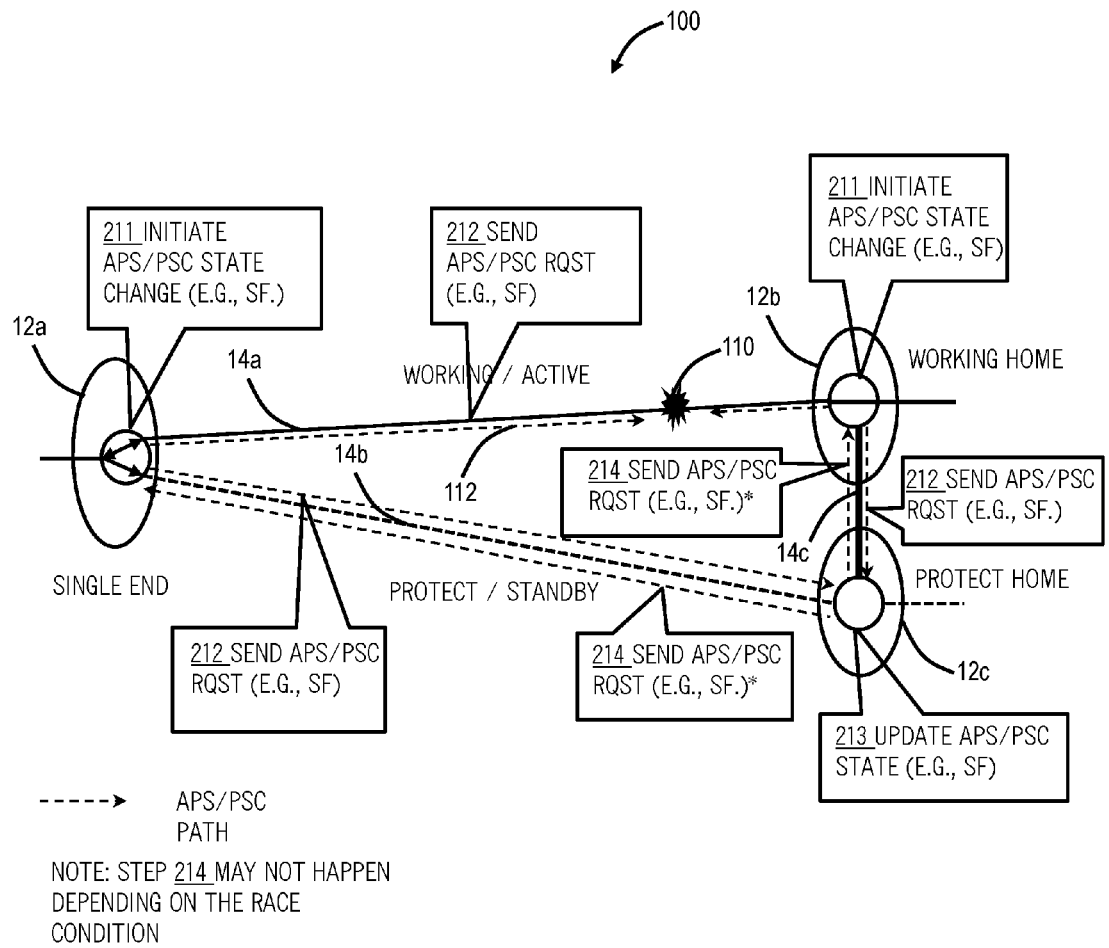
FIG. 20 is a network diagram of the network of FIG. 10 and an exemplary operation (signal fail) of the packet network linear protection method of FIG. 9 with 1+1 protection.

Referring to FIG. 20 in an exemplary embodiment, a network diagram illustrates the network 100 and an exemplary operation (signal fail) of the packet network linear protection method 50. Specifically, the exemplary operation of FIG. 20 is shown on the network 100 of FIG. 10 with a fault 110 on the working link 14a. A dotted line illustrates a path of protection messages 112, such as APS or PSC messages. Subsequent to the fault 110, the end node 12a and the node 12b initiate an APS/PSC state change (e.g., signal fail (SF)) in their protection switch state machine (step 211). The end node 12a and the node 12b send protection messages 112 for an APS/PSC request (step 212). Specifically, the end node 12a transmits the protection messages 112 to the node 12b (which are blocked by the fault 110) and the node 12c. The node 12b transmits the protection messages 112 to the end node 12a (which are blocked by the fault 110) and the node 12c via the designated link 14c. The node 12c, upon receiving the protection messages 112 from either the end node 12a or the node 12b, updates its APS/PSC state in its protection switch state machine (step 213). Finally, the node 12c sends an APS/PSC request via the protection messages to the end node 12a or the node 12b (step 214). Note, the step 214 may not happen depending on the race condition. At this point, the protection switch state machines are synchronized between the nodes 12a, 12b, 12c, and the protect link 12b can become active.

Figure 21:
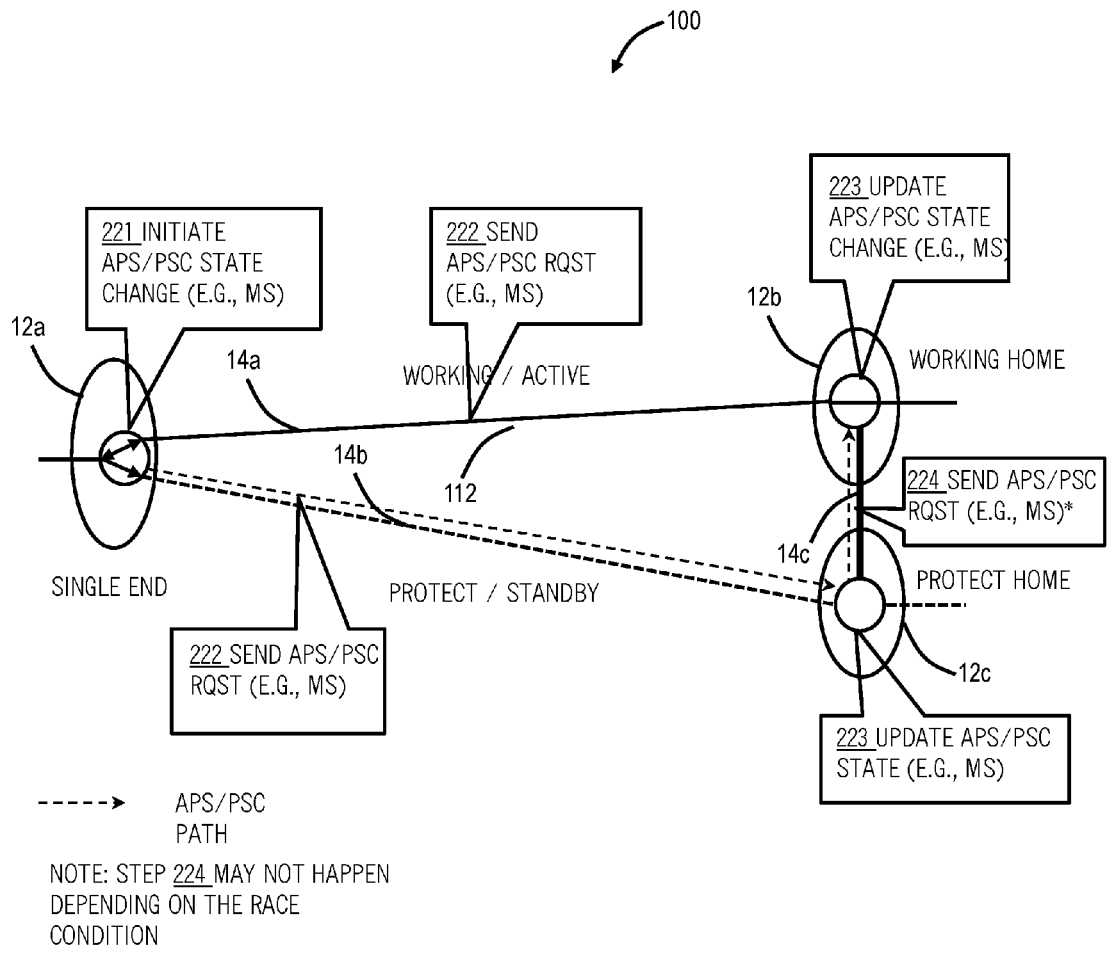
FIG. 21 is a network diagram of the network of FIG. 10 and an exemplary operation (manual switch from the end node) of the packet network linear protection method of FIG. 9 with 1+1 protection.

Referring to FIG. 21, in an exemplary embodiment, a network diagram illustrates the network 100 and an exemplary operation (manual switch from the end node 12a) of the packet network linear protection method 50. A dotted line illustrates a path of protection messages 112, such as APS or PSC messages. The end node 12a initiates an APS/PSC state change for a manual switch (MS) (step 221) updating its protection switch state machine. The end node 12a sends protection messages 112 for an APS/PSC request (MS) to the nodes 12b, 12c (step 222). The nodes 12b. 12c update an APS/PSC state change (MS) in their protection switch state machine (step 223). Optionally, the node 12c send an APS/PSC request (MS) to the node 12b via the designated link 14c (step 224).

Figure 22:
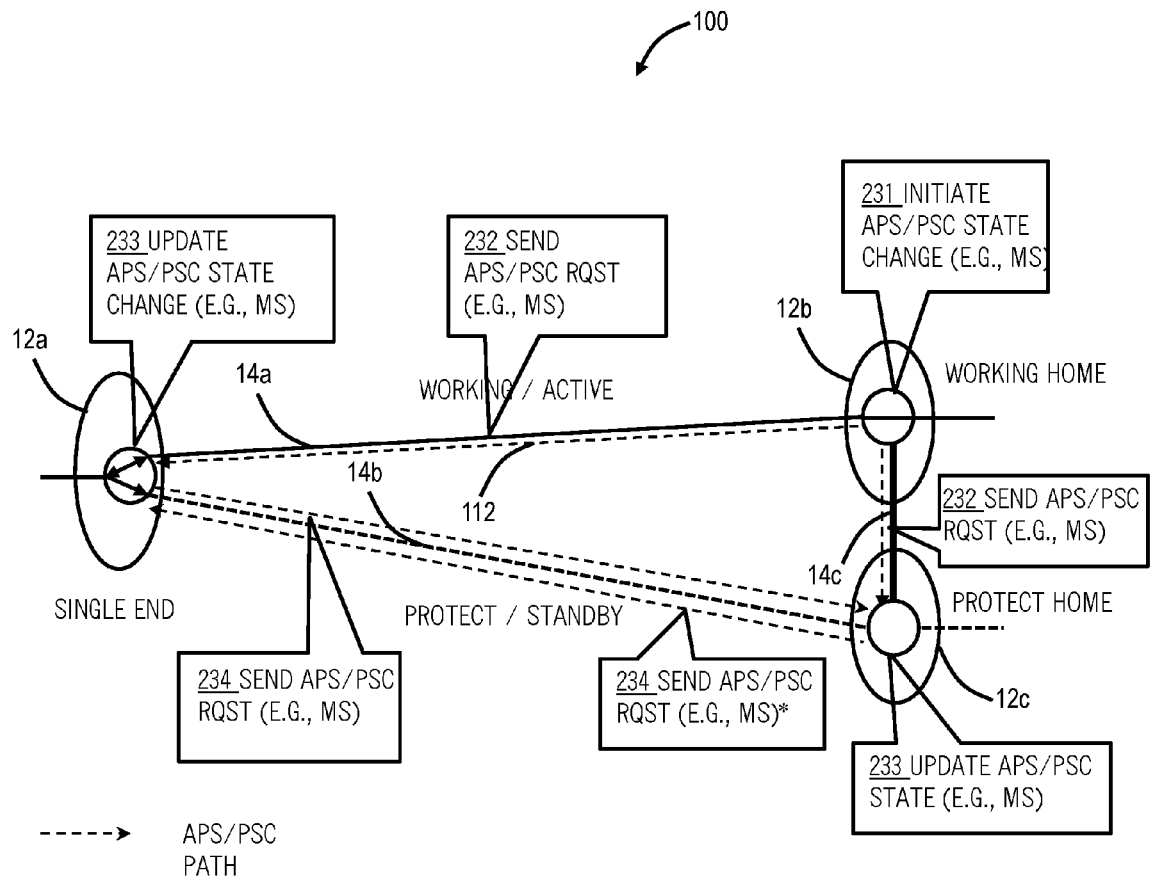
FIG. 22 is a network diagram of the network of FIG. 10 and an exemplary operation (manual switch from a home node) of the packet network linear protection method of FIG. 9 with 1+1 protection.

Referring to FIG. 22, in an exemplary embodiment, a network diagram illustrates the network 100 and an exemplary operation (manual switch from the node 12b) of the packet network linear protection method 50. A dotted line illustrates a path of protection messages 112, such as APS or PSC messages. The node 12b initiates an APS/PSC state change (MS) updating its protection switch state machine (step 231). The node 12b sends protection messages 112 for an APS/PSC request (MS) to the end node 12a and the node 12c via the designated link 14c (step 232). The end node 12a and the node 12c update their APS/PSC state change (MS) (step 233). Optionally, the end node 12a and the node 12c send an APS/PSC request (MS) (step 234).

Figure 23:
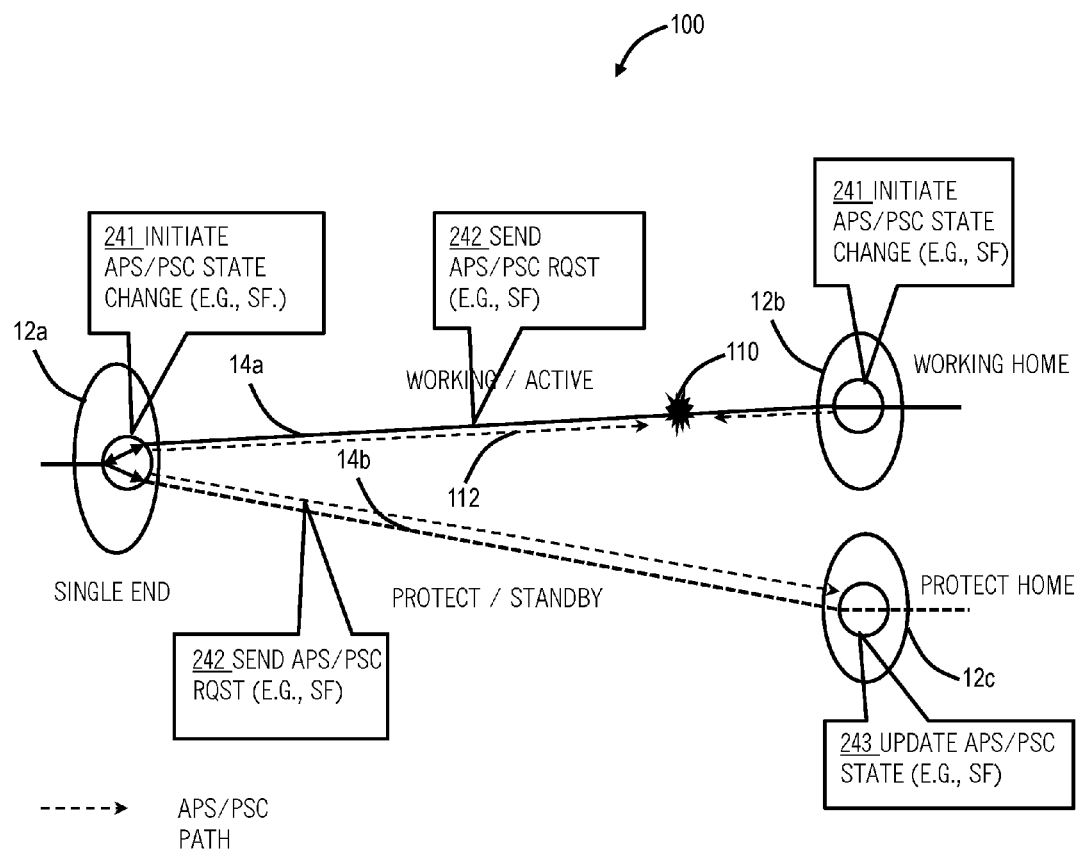
FIG. 23 is a network diagram of the network of FIG. 11 and an exemplary operation (signal fail) of the packet network linear protection method of FIG. 9 with 1+1 protection.

Referring to FIG. 23, in an exemplary embodiment, a network diagram illustrates the network 100 and an exemplary operation (signal fail) of the packet network linear protection method 50. Specifically, the exemplary operation of FIG. 23 is shown on the network 100 of FIG. 11 with a fault 110 on the working link 14a. A dotted line illustrates a path of protection messages 112, such as APS or PSC messages. Subsequent to the fault 110, the end node 12a and the node 12b initiate an APS/PSC state change (e.g., signal fail (SF)) in their protection switch state machine (step 241). The end node 12a and the node 12b send protection messages 112 for an APS/PSC (SF) request (step 242). Specifically, the end node 12a transmits the protection messages 112 to the node 12b (which are blocked by the fault 110) and the node 12c. The node 12b transmits the protection messages 112 to the end node 12a (which are blocked by the fault 110). The node 12c, upon receiving the protection messages 112 from the end node 12a updates its APS/PSC state in its protection switch state machine (step 243). In case Working Home APS/PSC state is out of sync at the node 12b (e.g., after the fault, Single End changes APS/PSC state to lockout), it will be in sync after the fault is cleared. However, this does not affect operation since the nodes 12a, 12c correctly note the fault 110 and operate the protect link 14b as active.

Figure 24:
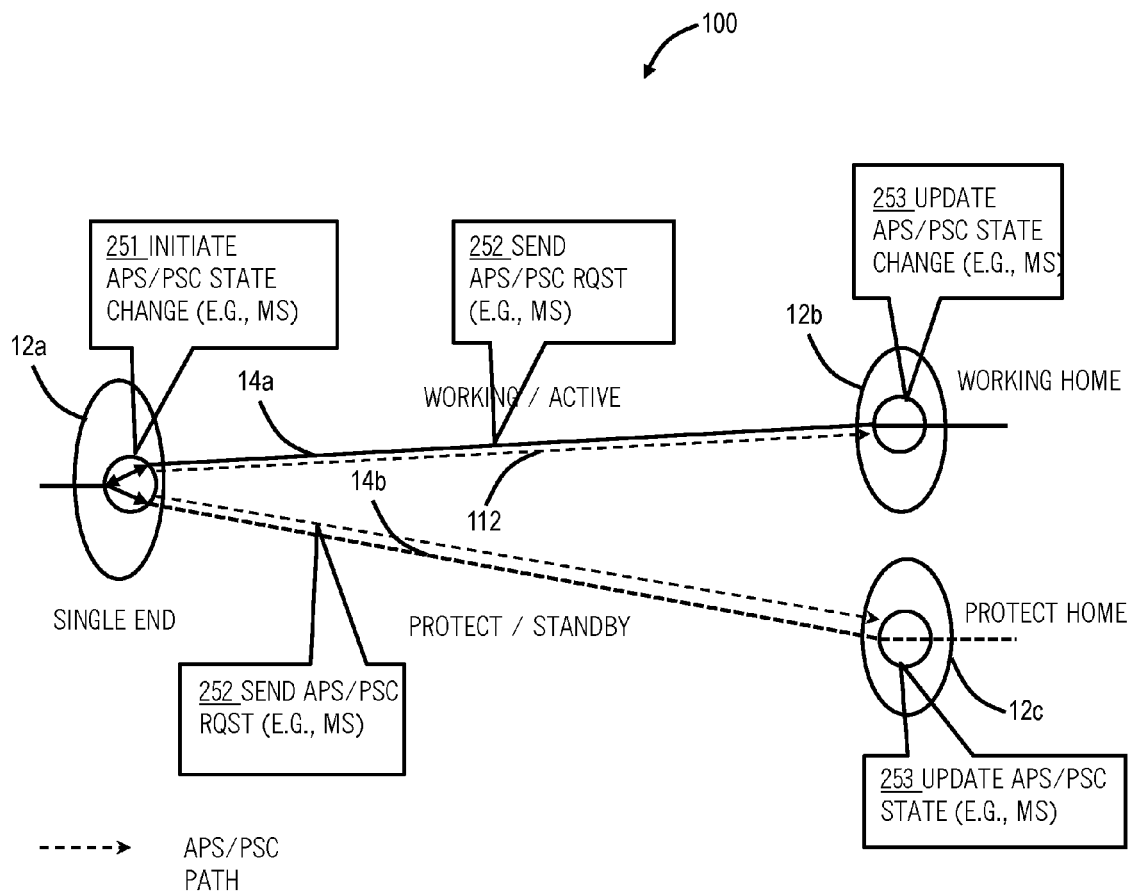
FIG. 24 is a network diagram of the network of FIG. 11 and an exemplary operation (manual switch from the end node) of the packet network linear protection method of FIG. 9 with 1+1 protection.

Referring to FIG. 24, in an exemplary embodiment, a network diagram illustrates the network 100 and an exemplary operation (manual switch from the end node 12a) of the packet network linear protection method 50. A dotted line illustrates a path of protection messages 112, such as APS or PSC messages. The end node 12a initiates an APS/PSC state change for a manual switch (MS) (step 251) updating its protection switch state machine. The end node 12a sends protection messages 112 for an APS/PSC request (MS) to the nodes 12b, 12c (step 252). The nodes 12b, 12c update an APS/PSC state change (MS) in their protection switch state machine (step 253).

Figure 25:
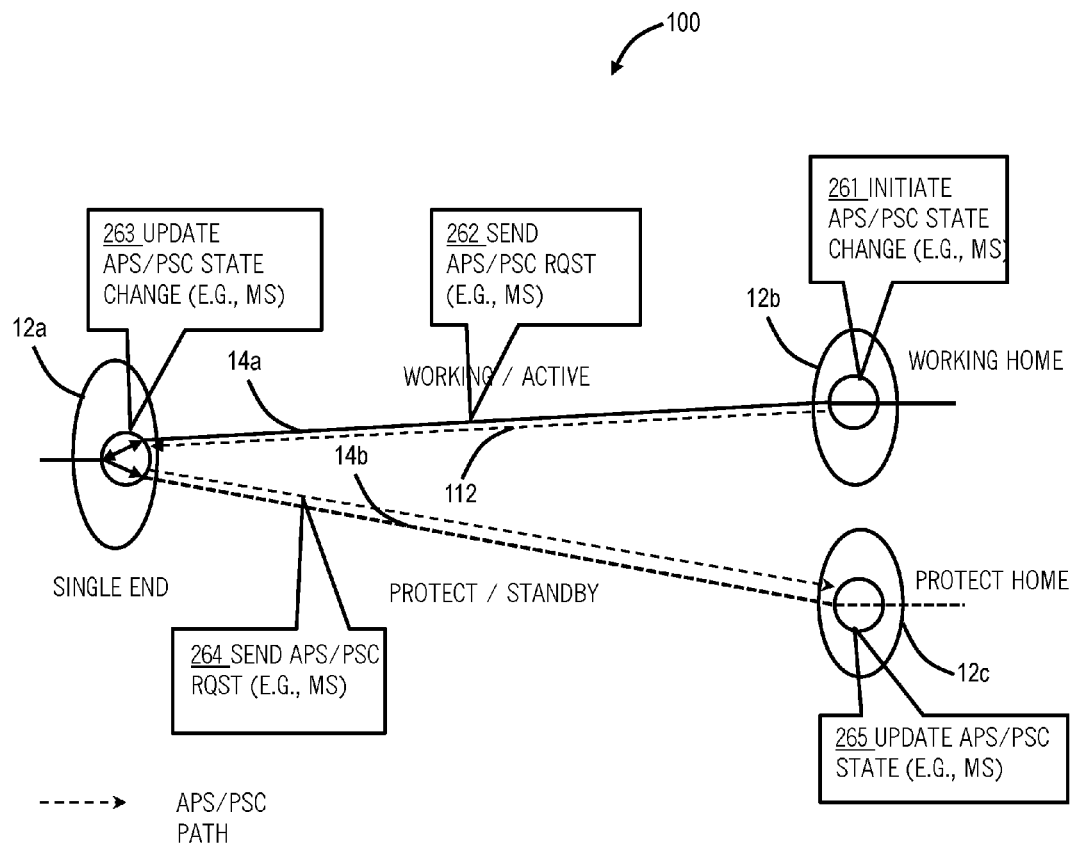
FIG. 25 is a network diagram of the network of FIG. 11 and an exemplary operation (manual switch from a home node) of the packet network linear protection method of FIG. 9 with 1+1 protection.

Referring to FIG. 25, in an exemplary embodiment, a network diagram illustrates the network 100 and an exemplary operation (manual switch from the node 12b) of the packet network linear protection method 50. A dotted line illustrates a path of protection messages 112, such as APS or PSC messages. The node 12b initiates an APS/PSC state change (MS) (step 261). The node 12b sends an APS/PSC request (MS) to the end node 12a (step 262). The end node 12a updates is APS/PSC state change (MS) (step 263) and sends an APS/PSC request (MS) to the node 12c (step 264) and the node 12c updates its APS/PSC state (MS) (step 265).

FIGS. 18-25 illustrate 1+1 linear protection, and note, from the APS/PSC state exchange point of view, there is no difference between 1:1 and 1+1 linear protection, except the APS/PSC PDU protection type indications.

The various exemplary embodiments described herein have been illustrated with respect to dual home configurations. To extend these same systems and method to a multi-home configuration, there will be one active and multiple standby links. For example, in the dual home configuration, the administrative role (or operational state)

can be active or standby. In the multi-home configuration, there are more than one standby home nodes. A protection weight can be assigned to the standby homes, e.g., STBY#1, STBY#2, . . . STBY#n, etc.

Exemplary Network Element/Node Configuration

Figure 26:
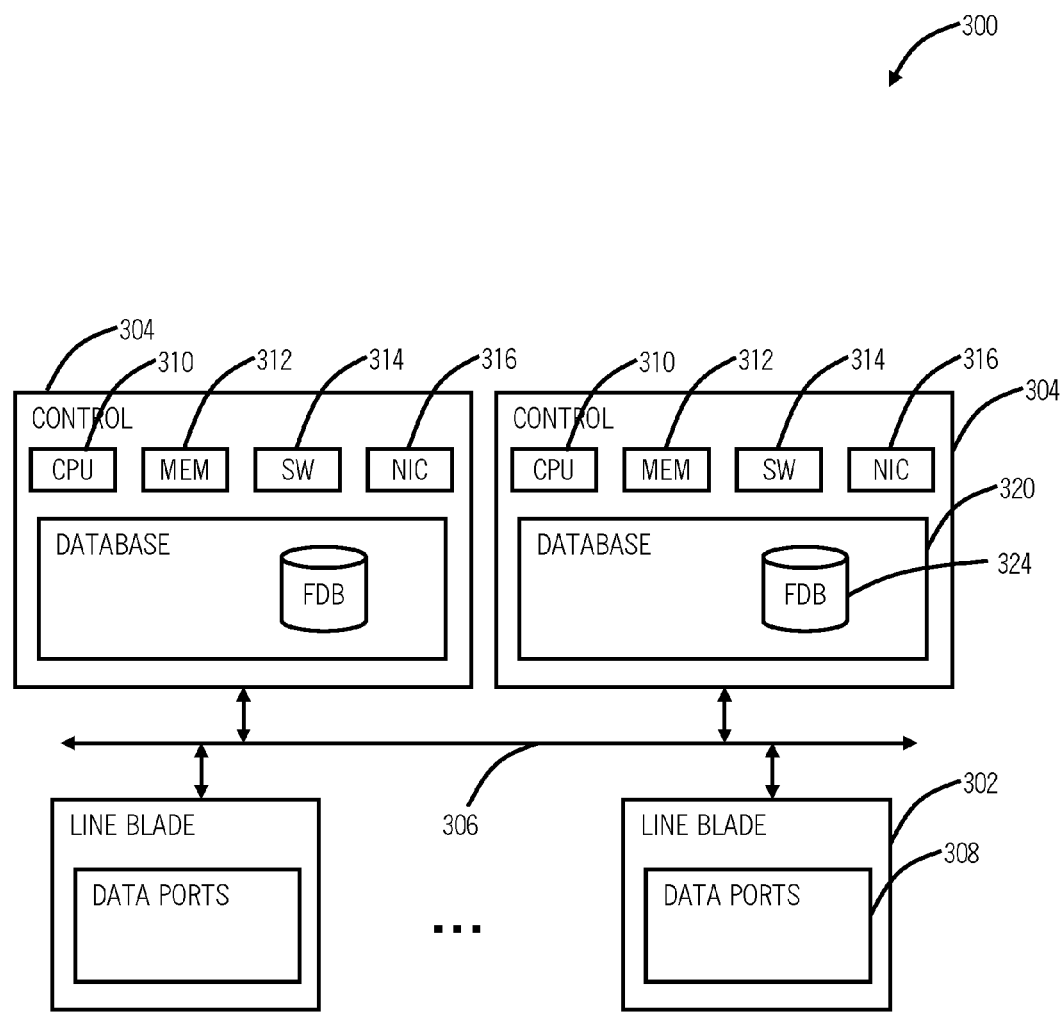
FIG. 26 is a block diagram of an exemplary implementation of a network element for the nodes.

Referring to FIG. 26, in an exemplary embodiment, a block diagram illustrates an exemplary implementation of a network element 300 for the nodes 12a, 12b, 12c. In this exemplary embodiment, the network element 300 is an Ethernet network switch, but those of ordinary skill in the art will recognize the present invention contemplates other types of network elements and other implementations, such as, for example, a layer two switch integrated within an optical network element. In this exemplary embodiment, the network element 300 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e. the network element 300. In another exemplary embodiment, the functionality of each of the blades 302, 304 may be integrated within a single module, such as in the layer two switch integrated within an optical network element. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 300 out by the correct port 308 to the next network element. "Switching fabric" includes switching units, or individual boxes, in a node; integrated circuits contained in the switching units; and programming that allows switching paths to be controlled.

The control blades 304 include a microprocessor 310, memory 312, software 314, and a network interface 316 to operate within the networks 100, 200. Specifically, the microprocessor 310, the memory 312, and the software 314 may collectively control, configure, provision, monitor, etc. the network element 300. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this exemplary embodiment, the network element 300 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 300. In an exemplary embodiment, the blades 302, 304 are configured to implement 1:1/1+1 linear protection protocols as described herein. The network element 300 can be implemented as the end node 12a or the home nodes 12b, 12c and implement the various packet network linear protection systems and methods described herein.

Specifically, the network element 300 can be the end node 12a or one of the home nodes 12b, 12c, based on provisioning and configuration. The network element 300 can include a plurality of ports communicatively coupled to a plurality of nodes over associated links in the dual or multi-home configuration; a controller communicatively coupled to the plurality of ports and operating a protection switch state machine associated with a linear protection protocol; wherein, if the node is a home node in the dual or multi-home configuration, the controller is configured to: receive a designation as a working home or a protect home; designate a link with the end node as active or standby; operate the protection switch state machine; and communicate protection messages and protection state changes to the end node and other home nodes; and wherein, if the node is the end node in the dual or multi-home configuration, the controller is configured to: designate each link with home nodes in the dual or multi-home configuration as active or standby; operate the protection switch state machine; and communicate protection messages and protection state changes to each of the home nodes.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A linear protection method in a dual home or multi-home network configuration with an end node communicatively coupled to a plurality of home nodes, the linear protection method comprising:
   operating a protection switch state machine based on a linear protection protocol at each of the plurality of home nodes and the end node, wherein the protection switch state machine is configured to support a plurality of linear protection protocols comprising the linear protection protocol;
   synchronizing the protection switch state machines with one another;
   implementing operations between the plurality of home nodes and the end node based on the protection switch state machines; and
   responsive to a fault, updating the associated protection switch state machines without synchronizing over a link associated with the fault and performing protection switching.

2. The linear protection method of claim 1, wherein the plurality of linear protection protocols comprise Automatic Protection Switching (APS) in G.8031, Protection State Coordination (PSC) in Multiprotocol Label Switching (MPLS) Transport Profile (MPLS-TP) (RFC 6377), Provider Backbone Bridge Traffic Engineering (PBB-TE) Tunnel Protection (IEEE 802.1ay), and 1:1 pseudowire (PW).

3. The linear protection method of claim 1, wherein the protection switch state machines are managed in a generic manner independent of the plurality of linear protection protocols.

4. The linear protection method of claim 1, wherein the synchronizing utilizes a dedicated communication channel between the plurality of home nodes and the end node.

5. The linear protection method of claim 1, wherein the synchronizing utilizes protection Protocol Data Units exchanged between the plurality of home nodes and the end node.

6. The linear protection method of claim 1, wherein the implementing operations comprises protection switching comprising 1+1 or 1:1 packet network protection coordination between the plurality of home nodes and the end node independent of the linear protection protocol.

7. The linear protection method of claim 1, wherein the implementing operations comprises switching between the plurality of home nodes and the end node based on one or more of a manual switch from any node and a signal fail.

8. The linear protection method of claim 1, wherein the associated linear protection protocol for at least two of the plurality of home nodes is different and interoperable based on the protection switch state machines.

9. The linear protection method of claim 1, wherein the protection switch state machines adapt states from Automatic Protection Switching (APS) in G.8031, IEEE 802.1ay, RFC 6718, and RFC 6377 into a common format with associated operations independent of the associated linear protection protocol.

10. A network configured to implement linear protection in a dual home or multi-home network configuration, the network comprising:
   an end node communicatively coupled to a plurality of home nodes;
   wherein each of the end node and the plurality of home nodes are configured to
      implement a protection switch state machine based on a linear protection protocol, wherein the protection switch state machine is configured to support a plurality of linear protection protocols comprising the linear protection protocol,
      synchronize the protection switch state machines with one another,
      implement operations between one another based on the protection switch state machines, and
      responsive to a fault, update the associated protection switch state machines without synchronizing over a link associated with the fault and perform protection switching.

11. The network of claim 10, wherein the plurality of linear protection protocols comprise Automatic Protection Switching (APS) in G.8031, Protection State Coordination (PSC) in Multiprotocol Label Switching (MPLS) Transport Profile (MPLS-TP) (RFC 6377), Provider Backbone Bridge Traffic Engineering (PBB-TE) Tunnel Protection (IEEE 802.1ay), and 1:1 pseudowire (PW).

12. The network of claim 10, wherein the protection switch state machines are managed in a generic manner independent of the plurality of linear protection protocols.

13. The network of claim 10, wherein the protection switch state machines are synchronized via a dedicated communication channel between the plurality of home nodes and the end node.

14. The network of claim 10, wherein the protection switch state machines are synchronized via protection Protocol Data Units exchanged between the plurality of home nodes and the end node.

15. The network of claim 10, wherein the operations are implemented as a protection switching comprising 1+1 or 1:1 packet network protection coordination between the plurality of home nodes and the end node independent of the linear protection protocol.

16. The network of claim 10, wherein the associated linear protection protocol for at least two of the plurality of home nodes is different and interoperable based on the protection switch state machines.

17. The network of claim 10, wherein the protection switch state machines adapt states from Automatic Protection Switching (APS) in G.8031, IEEE 802.1ay, RFC 6718, and RFC 6377 into a common format with associated operations independent of the associated linear protection protocol.

18. A linear protection method in a dual home or multi-home network configuration with an end node communicatively coupled to a plurality of home nodes, the linear protection method comprising:
   operating a protection switch state machine based on a linear protection protocol at each of the plurality of home nodes and the end node, wherein the protection switch state machine is configured to support a plurality of linear protection protocols comprising the linear protection protocol;
   synchronizing the protection switch state machines with one another; and
   implementing operations between the plurality of home nodes and the end node based on the protection switch state machines,
   wherein the protection switch state machines adapt states from Automatic Protection Switching (APS) in G.8031, IEEE 802.1ay, RFC 6718, and RFC 6377 into a common format with associated operations independent of the associated linear protection protocol.

19. The linear protection method of claim 18, further comprising:

responsive to a fault, updating the associated protection switch state machines without synchronizing over a link associated with the fault and performing protection switching.

20. The linear protection method of claim 18, wherein the synchronizing utilizes a dedicated communication channel between the plurality of home nodes and the end node.

21. The linear protection method of claim 18, wherein the implementing operations comprises protection switching comprising 1+1 or 1:1 packet network protection coordination between the plurality of home nodes and the end node independent of the linear protection protocol.

* * * * *